(12) United States Patent
Schumacher et al.

(10) Patent No.: US 10,870,333 B2
(45) Date of Patent: Dec. 22, 2020

(54) RECONFIGURABLE UTILITY POWER INPUT WITH PASSIVE VOLTAGE BOOSTER

(71) Applicant: THERMO KING CORPORATION, Minneapolis, MN (US)

(72) Inventors: Ryan Wayne Schumacher, Bloomington, MN (US); Marcelo Andrade Dias, Lakeville, MN (US); Esteban Canade Tarquini, Minneapolis, MN (US)

(73) Assignee: Thermo King Corporation, Minneapolis, MN (US)

( * ) Notice: Subject to any disclaimer, the term of this patent is extended or adjusted under 35 U.S.C. 154(b) by 0 days.

(21) Appl. No.: 16/176,602

(22) Filed: Oct. 31, 2018

(65) Prior Publication Data
US 2020/0136504 A1 Apr. 30, 2020

(51) Int. Cl.
*B60L 1/00* (2006.01)
*B60L 3/00* (2019.01)
(Continued)

(52) U.S. Cl.
CPC ............ *B60H 1/3205* (2013.01); *H02M 7/12* (2013.01); *B60H 1/3232* (2013.01)

(58) Field of Classification Search
CPC ...... H02M 3/073; H02M 7/12; B60H 1/3205; B60H 1/3232; B60H 1/3226
See application file for complete search history.

(56) References Cited

U.S. PATENT DOCUMENTS 5,104,037 A 4/1992 Karg et al.
6,280,320 B1 8/2001 Paschke et al.
(Continued)

FOREIGN PATENT DOCUMENTS

CN 2456117 10/2001
CN 1885660 12/2006
(Continued)

OTHER PUBLICATIONS

Yang et al, "The Role of Thermal Plume in Person-to-Person Contaminant Cross Transmission", 2017 Winter Conference, Seminar 36; Modeling and Control of the Personal Microenvironment, 5 pages.

(Continued)

*Primary Examiner* — Rexford N Barnie
*Assistant Examiner* — Rasem Mourad
(74) *Attorney, Agent, or Firm* — Hamre, Schumann, Mueller & Larson, P.C.

(57) ABSTRACT

Methods and systems for reconfigurable utility power with passive voltage booster for a transport climate control system are provided. The transport climate control system includes a passive boost circuit. The system also includes a controller configured to determine whether the passive boost circuit is connected to one of a first utility power and a second utility power. The controller instructs the passive boost circuit to operate in a first configuration when the passive boost circuit is connected to the first utility power and instructs the passive boost circuit to operate in a second configuration when the passive boost circuit is connected to the second utility power. The system further includes a load such as a motor. The load can drive a device such as a compressor, a fan, etc. The load is connected to the passive boost circuit and configured to receive power from the passive boost circuit.

20 Claims, 13 Drawing Sheets

(51) Int. Cl.
*B60H 1/32* (2006.01)
*H02M 7/12* (2006.01)

(56) References Cited

U.S. PATENT DOCUMENTS

| | | | |
|---|---|---|---|
| 6,487,869 B1 | 12/2002 | Sulc et al. | |
| 6,518,727 B2 | 2/2003 | Oomura et al. | |
| 6,560,980 B2 | 5/2003 | Gustafson et al. | |
| 6,600,237 B1 | 7/2003 | Meissner | |
| 6,631,080 B2 | 10/2003 | Trimble et al. | |
| 6,688,125 B2 | 2/2004 | Okamoto et al. | |
| 6,753,692 B2 | 6/2004 | Toyomura et al. | |
| 7,011,902 B2 | 3/2006 | Pearson | |
| 7,120,539 B2 | 10/2006 | Krull et al. | |
| 7,151,326 B2 | 12/2006 | Jordan | |
| 7,206,692 B2 | 4/2007 | Beesley et al. | |
| 7,424,343 B2 | 9/2008 | Kates | |
| 7,449,798 B2 | 11/2008 | Suzuki et al. | |
| 7,532,960 B2 | 5/2009 | Kumar | |
| 7,728,546 B2 | 6/2010 | Tanaka et al. | |
| 7,730,981 B2 | 6/2010 | McCabe et al. | |
| 7,830,117 B2 | 11/2010 | Ambrosio et al. | |
| 7,898,111 B1 * | 3/2011 | Pistel | H02J 1/102 307/82 |
| 7,900,462 B2 | 3/2011 | Hegar et al. | |
| 8,030,880 B2 | 10/2011 | Alston et al. | |
| 8,170,886 B2 | 5/2012 | Luff | |
| 8,214,141 B2 | 7/2012 | Froeberg | |
| 8,295,950 B1 | 10/2012 | Wordsworth et al. | |
| 8,381,540 B2 | 2/2013 | Alston | |
| 8,441,228 B2 | 5/2013 | Brabee | |
| 8,476,872 B2 | 7/2013 | Truckenbrod et al. | |
| 8,487,458 B2 | 7/2013 | Steele et al. | |
| 8,541,905 B2 | 9/2013 | Brabee | |
| 8,602,141 B2 | 12/2013 | Yee et al. | |
| 8,626,419 B2 | 1/2014 | Mitchell et al. | |
| 8,643,216 B2 | 2/2014 | Lattin | |
| 8,643,217 B2 | 2/2014 | Gietzold et al. | |
| 8,670,225 B2 | 3/2014 | Nunes | |
| 8,723,344 B1 | 5/2014 | Dierickx | |
| 8,760,115 B2 | 6/2014 | Kinser et al. | |
| 8,764,469 B2 | 7/2014 | Lamb | |
| 8,818,588 B2 | 8/2014 | Ambrosio et al. | |
| 8,978,798 B2 | 3/2015 | Dalum et al. | |
| 9,030,336 B2 | 5/2015 | Doyle | |
| 9,061,680 B2 | 6/2015 | Dalum | |
| 9,093,788 B2 | 7/2015 | Lamb | |
| 9,102,241 B2 | 8/2015 | Brabee | |
| 9,147,335 B2 | 9/2015 | Raghunathan et al. | |
| 9,199,543 B2 | 12/2015 | Brabee | |
| 9,313,616 B2 | 4/2016 | Mitchell et al. | |
| 9,436,853 B1 | 9/2016 | Meyers | |
| 9,463,681 B2 | 10/2016 | Olaleye et al. | |
| 9,557,100 B2 | 1/2017 | Chopko et al. | |
| 9,562,715 B2 | 2/2017 | Kandasamy | |
| 9,694,697 B2 | 7/2017 | Brabee | |
| 9,738,160 B2 | 8/2017 | Bae et al. | |
| 9,758,013 B2 | 9/2017 | Steele | |
| 9,783,024 B2 | 10/2017 | Connell et al. | |
| 9,825,549 B2 | 11/2017 | Choi et al. | |
| 9,846,086 B1 | 12/2017 | Robinson et al. | |
| 9,893,545 B2 | 2/2018 | Bean | |
| 9,931,960 B2 | 4/2018 | Tabatowski-Bush et al. | |
| 9,987,906 B2 | 6/2018 | Kennedy | |
| 10,000,122 B2 | 6/2018 | Wu et al. | |
| 10,148,212 B2 | 12/2018 | Schumacher et al. | |
| 2002/0113576 A1 | 8/2002 | Oomura et al. | |
| 2003/0043607 A1 * | 3/2003 | Vinciarelli | H02M 1/4208 363/61 |
| 2003/0106332 A1 | 6/2003 | Okamoto et al. | |
| 2003/0200017 A1 | 10/2003 | Capps et al. | |
| 2005/0057210 A1 | 3/2005 | Ueda et al. | |
| 2006/0284601 A1 | 12/2006 | Salasoo et al. | |
| 2007/0052241 A1 | 3/2007 | Pacy | |
| 2007/0131408 A1 | 6/2007 | Zeigler et al. | |
| 2007/0192116 A1 | 8/2007 | Levitt | |
| 2008/0023965 A1 | 1/2008 | Cagliari et al. | |
| 2009/0121798 A1 | 5/2009 | Levinson | |
| 2009/0126901 A1 | 5/2009 | Hegar et al. | |
| 2009/0178424 A1 | 7/2009 | Hwang et al. | |
| 2009/0229288 A1 | 9/2009 | Alston et al. | |
| 2009/0314019 A1 | 12/2009 | Fujimoto et al. | |
| 2009/0320515 A1 | 12/2009 | Bischofberger et al. | |
| 2010/0230224 A1 | 9/2010 | Hindman | |
| 2010/0312425 A1 | 12/2010 | Obayashi et al. | |
| 2010/0320018 A1 | 12/2010 | Gwozdek et al. | |
| 2011/0000244 A1 | 1/2011 | Reason et al. | |
| 2011/0114398 A1 | 5/2011 | Bianco | |
| 2011/0224841 A1 | 9/2011 | Profitt-Brown et al. | |
| 2012/0000212 A1 | 1/2012 | Sanders et al. | |
| 2012/0116931 A1 | 5/2012 | Meyers | |
| 2012/0198866 A1 | 8/2012 | Zeidner | |
| 2013/0000342 A1 | 1/2013 | Blasko et al. | |
| 2013/0088900 A1 | 4/2013 | Park | |
| 2013/0158828 A1 | 6/2013 | McAlister | |
| 2013/0231808 A1 | 9/2013 | Flath et al. | |
| 2014/0026599 A1 | 1/2014 | Rusignuolo et al. | |
| 2014/0060097 A1 | 3/2014 | Perreault | |
| 2015/0081212 A1 | 3/2015 | Mitchell et al. | |
| 2015/0188360 A1 | 7/2015 | Doane et al. | |
| 2015/0231948 A1 | 8/2015 | Kennedy | |
| 2015/0246593 A1 | 9/2015 | Larson et al. | |
| 2015/0355288 A1 | 12/2015 | Yokoyama et al. | |
| 2015/0360568 A1 * | 12/2015 | Champagne | B60H 1/00364 296/156 |
| 2016/0011001 A1 | 1/2016 | Emory et al. | |
| 2016/0035152 A1 | 2/2016 | Kargupta | |
| 2016/0280040 A1 | 9/2016 | Connell et al. | |
| 2016/0285416 A1 | 9/2016 | Tiwari et al. | |
| 2017/0030728 A1 | 2/2017 | Baglino et al. | |
| 2017/0057323 A1 | 3/2017 | Neu et al. | |
| 2017/0098954 A1 | 4/2017 | Ferguson et al. | |
| 2017/0259764 A1 | 9/2017 | Da Silva Carvalho et al. | |
| 2018/0029436 A1 | 2/2018 | Zaeri et al. | |
| 2018/0029488 A1 | 2/2018 | Sjödin | |
| 2018/0111441 A1 | 4/2018 | Menard et al. | |
| 2018/0170398 A1 | 6/2018 | Miller et al. | |
| 2018/0201092 A1 | 7/2018 | Ahhuja et al. | |
| 2018/0203443 A1 | 7/2018 | Newman | |
| 2018/0222278 A1 | 8/2018 | Mizuma | |
| 2018/0342876 A1 | 11/2018 | Agnew et al. | |
| 2018/0342877 A1 | 11/2018 | Yoo et al. | |
| 2018/0356870 A1 | 12/2018 | Rusignuolo | |
| 2019/0086138 A1 * | 3/2019 | Chopko | F25D 19/04 |
| 2019/0092122 A1 | 3/2019 | Vanous et al. | |
| 2019/0123544 A1 * | 4/2019 | Pelegris | H02H 3/207 |
| 2019/0184838 A1 | 6/2019 | Lee et al. | |
| 2019/0255164 A1 | 8/2019 | Ikeda et al. | |
| 2019/0283541 A1 | 9/2019 | Adetola et al. | |
| 2020/0086712 A1 | 3/2020 | Schumacher et al. | |
| 2020/0086744 A1 | 3/2020 | Schumacher et al. | |
| 2020/0101818 A1 | 4/2020 | Holmstrom et al. | |
| 2020/0101820 A1 | 4/2020 | Wenger et al. | |

FOREIGN PATENT DOCUMENTS

| | | |
|---|---|---|
| CN | 2912069 | 6/2007 |
| CN | 101713577 | 5/2010 |
| CN | 202038315 | 11/2011 |
| CN | 104734178 | 6/2015 |
| CN | 105711376 | 6/2016 |
| CN | 106184252 | 12/2016 |
| CN | 106766419 | 5/2017 |
| CN | 106774131 | 5/2017 |
| CN | 108074466 | 5/2018 |
| CN | 108931006 | 12/2018 |
| CN | 208306320 | 1/2019 |
| CN | 208650989 | 3/2019 |
| DE | 3817365 | 11/1989 |
| DE | 29715576 | 12/1997 |
| DE | 10138750 | 2/2003 |
| DE | 10200637 | 10/2003 |
| DE | 102011050719 | 12/2012 |
| EP | 0282051 | 9/1988 |

(56) References Cited

FOREIGN PATENT DOCUMENTS

| | | |
|---|---|---|
| EP | 1935712 | 6/2008 |
| EP | 2365915 | 9/2011 |
| EP | 2689944 | 1/2014 |
| EP | 2717016 | 9/2014 |
| EP | 3343728 | 7/2018 |
| EP | 3536552 | 9/2019 |
| EP | 3540340 | 9/2019 |
| GB | 2551999 | 1/2018 |
| JP | 2000-158930 | 6/2000 |
| JP | 2007-320352 | 12/2007 |
| JP | 2009-243780 | 10/2009 |
| JP | 2019-145521 | 8/2019 |
| KR | 10-2012-0092834 | 8/2012 |
| WO | 03038988 | 5/2003 |
| WO | 2011066468 | 6/2011 |
| WO | 2012138497 | 10/2012 |
| WO | 2013096084 | 6/2013 |
| WO | 2014002244 | 1/2014 |
| WO | 2014058610 | 4/2014 |
| WO | 2014085672 | 6/2014 |
| WO | 2014106060 | 7/2014 |
| WO | 2014106068 | 7/2014 |
| WO | 2016145107 | 9/2016 |
| WO | 2017058660 | 4/2017 |
| WO | 2017172484 | 10/2017 |
| WO | 2017172855 | 10/2017 |
| WO | 2017176682 | 10/2017 |
| WO | 2017176725 | 10/2017 |
| WO | 2017176729 | 10/2017 |
| WO | 2017189485 | 11/2017 |
| WO | 2017218909 | 12/2017 |
| WO | 2017218910 | 12/2017 |
| WO | 2017218912 | 12/2017 |
| WO | 2018005957 | 1/2018 |
| WO | 2018009646 | 1/2018 |
| WO | 2018009798 | 1/2018 |
| WO | 2018017818 | 1/2018 |
| WO | 2018029502 | 2/2018 |
| WO | 2018204591 | 11/2018 |
| WO | 2018226389 | 12/2018 |
| WO | 2018226649 | 12/2018 |
| WO | 2018226848 | 12/2018 |
| WO | 2018226857 | 12/2018 |
| WO | 2018226862 | 12/2018 |
| WO | 2018226906 | 12/2018 |
| WO | 2018226981 | 12/2018 |
| WO | 2018226986 | 12/2018 |
| WO | 2019051086 | 3/2019 |
| WO | 2019151947 | 8/2019 |
| WO | 2020068446 | 4/2020 |
| WO | 2020068450 | 4/2020 |
| WO | 2020068469 | 4/2020 |
| WO | 2020068475 | 4/2020 |
| WO | 2020068502 | 4/2020 |
| WO | 2020068556 | 4/2020 |
| WO | 2020068641 | 4/2020 |
| WO | 2020068646 | 4/2020 |
| WO | 2020069107 | 4/2020 |

OTHER PUBLICATIONS

"Lamberet Smart Reefer on Solutrans", Zoeken, Jul. 28, 2015, 7 pages, available at: https://iepieleaks.nl/lamberet-smart-reefer-solutrans/.

U.S. Appl. No. 16/178,067, titled "Methods and Systems for Generation and Utilization of Supplemental Stored Energy for Use in Transport Climate Control", filed Nov. 1, 2018, 35 pages.

U.S. Appl. No. 16/565,063, titled "System and Method for Managing Power and Efficiently Sourcing a Variable Voltage for a Transport Climate Control System", filed Sep. 9, 2019, 59 pages.

U.S. Appl. No. 16/574,754, titled "Methods and Systems for Energy Management of a Transport Climate Control System", filed Sep. 18, 2019, 50 pages.

U.S. Appl. No. 16/574,775, titled "Methods and Systems for Power and Load Management of a Transport Climate Control System", filed Sep. 18, 2019, 68 pages.

European Patent Application No. 18382672.6, titled "Methods and Systems for Energy Management of a Transport Climate Control System", filed Sep. 19, 2018, 50 pages.

European Patent Application No. 18382673.4 titled "Methods and Systems for Power and Load Management of a Transport Climate Control System", filed Sep. 19, 2018, 68 pages.

U.S. Appl. No. 16/235,865, titled "Methods and Systems for Preserving Autonomous Operation of a Transport Climate Control System", filed Dec. 28, 2018, 50 pages.

U.S. Appl. No. 16/176,720, titled "Methods and Systems for Augmenting a Vehicle Powered Transport Climate Control System", filed Oct. 31, 2018, 33 pages.

U.S. Appl. No. 16/176,667, titled "Drive Off Protection System and Method for Preventing Drive Off", filed Oct. 31, 2018, 41 pages.

U.S. Appl. No. 16/176,802, titled "Methods and Systems for Controlling a Mild Hybrid System That Powers a Transport Climate Control System", filed Oct. 31, 2018, 39 pages.

U.S. Appl. No. 16/147,704, titled "Methods and Systems for Monitoring and Displaying Energy Use and Energy Cost of a Transport Vehicle Climate Control System or a Fleet of Transport Vehicle Climate Control Systems", filed Sep. 29, 2018, 33 pages.

U.S. Appl. No. 16/147,708, titled "Methods and Systems for Autonomous Climate Control Optimization of a Transport Vehicle", filed Sep. 29, 2018, 41 pages.

PCT International Application No. PCT/US2018/068136, titled "Methods and Systems for Providing Predictive Energy Consumption Feedback for Powering a Transport Climate Control System", filed Dec. 31, 2018, 34 pages.

PCT International Application No. PCT/US2018/068129, titled "Methods and Systems for Notifying and Mitigating a Suboptimal Event Occurring in a Transport Climate Control System", filed Dec. 31, 2018, 44 pages.

PCT International Application No. PCT/US2018/068139, titled "Methods and Systems for Providing Feedback for a Transport Climate Control System", filed Dec. 31, 2018, 37 pages.

PCT International Application No. PCT/US2018/068142, titled "Methods and Systems for Providing Predictive Energy Consumption Feedback for Powering a Transport Climate Control System Using External Data", filed Dec. 31, 2018, 39 pages.

U.S. Appl. No. 16/236,938, titled "Systems and Methods for Smart Load Shedding of a Transport Vehicle While in Transit", filed Dec. 31, 2018, 39 pages.

U.S. Appl. No. 16/565,110, titled "Transport Climate Control System With a Self-Configuring Matrix Power Converter", filed Sep. 9, 2019, 52 pages.

U.S. Appl. No. 16/565,146, titled "Optimized Power Management for a Transport Climate Control Energy Source", filed Sep. 9, 2019, 53 pages.

U.S. Appl. No. 62/897,833, titled "Optimized Power Distribution to Transport Climate Control Systems Amongst One or More Electric Supply Equipment Stations", filed Sep. 9, 2019, 41 pages.

European Patent Application No. 19382776.3, titled "Mprioritized Power Delivery for Facilitating Transport Climate Control", filed Sep. 9, 2019, 41 pages.

U.S. Appl. No. 16/565,205, titled "Transport Climate Control System With an Accessory Power Distribution Unit for Managing Transport Climate Control Loads", filed Sep. 9, 2019, 54 pages.

U.S. Appl. No. 16/565,235, titled "Interface System for Connecting a Vehicle and a Transport Climate Control System", filed Sep. 9, 2019, 64 pages.

U.S. Appl. No. 16/565,252, titled "Demand-Side Power Distribution Management for a Plurality of Transport Climate Control Systems", filed Sep. 9, 2019, 44 pages.

U.S. Appl. No. 16/565,282, titled "Optimized Power Cord for Transferring Power to a Transport Climate Control System", filed Sep. 9, 2019, 43 pages.

(56) References Cited

OTHER PUBLICATIONS

Extended European Search Report, issued in the corresponding European patent application No. 19205708.1, dated Mar. 24, 2020, 7 pages.

* cited by examiner

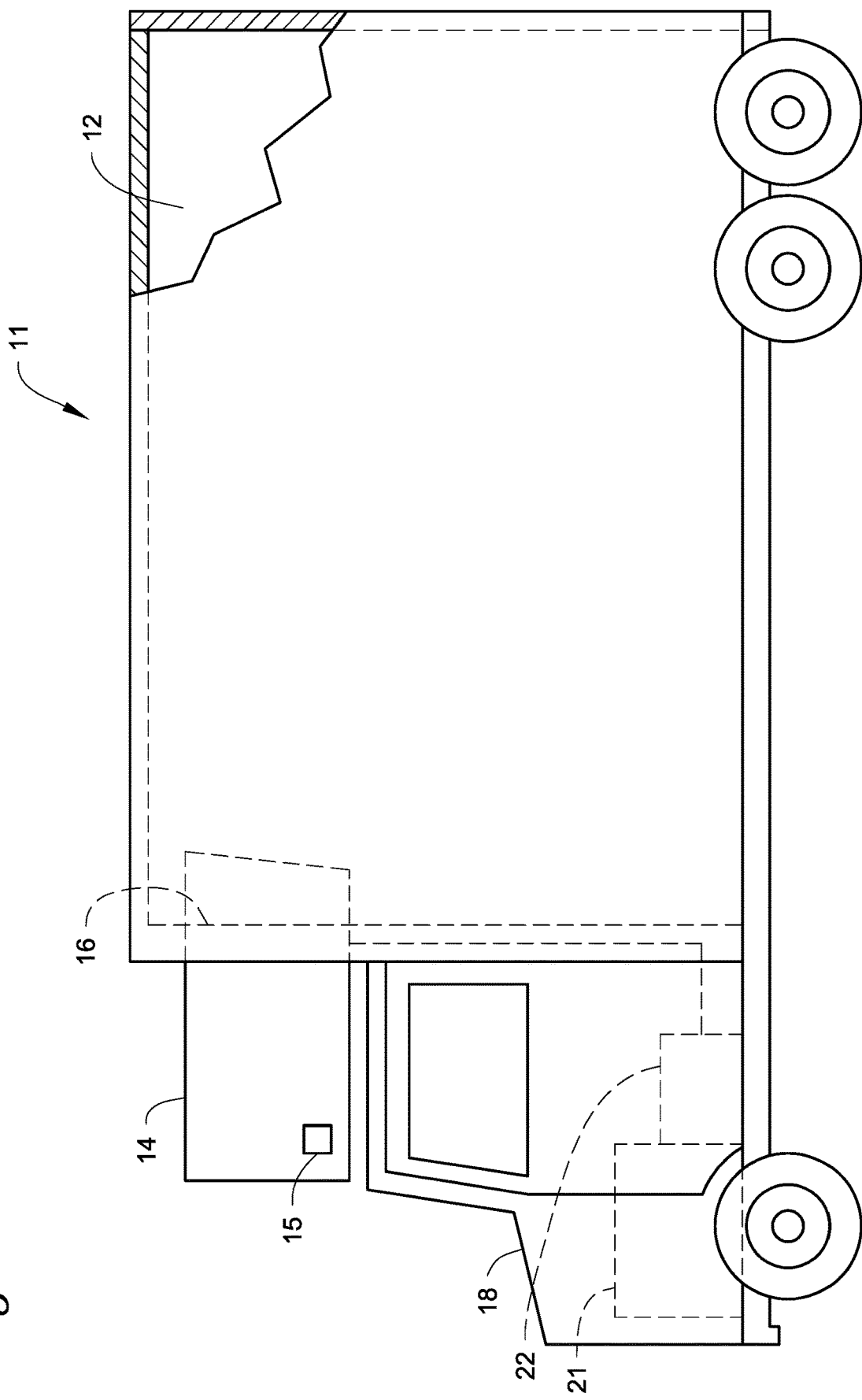

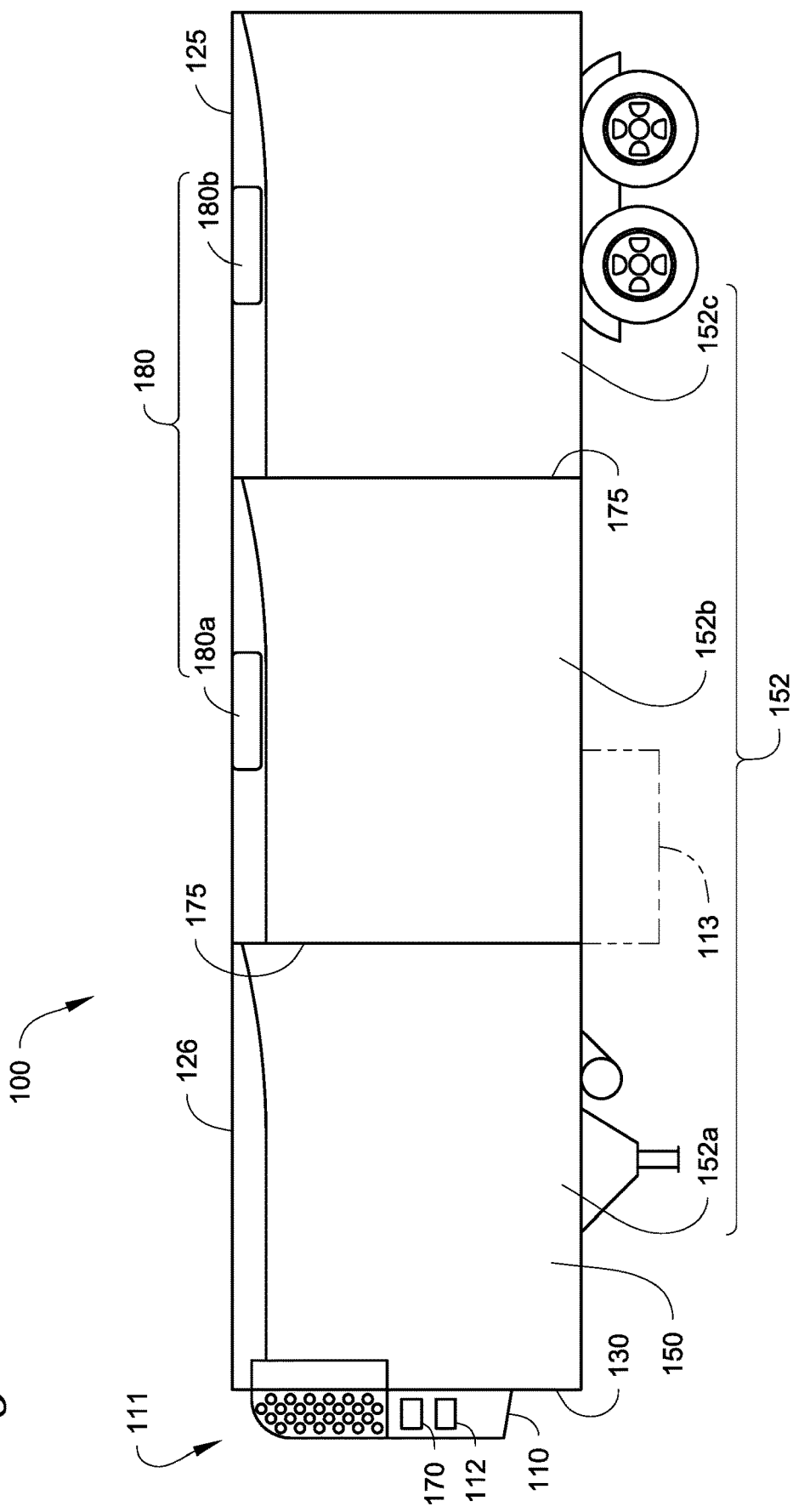

RECONFIGURABLE UTILITY POWER INPUT WITH PASSIVE VOLTAGE BOOSTER

FIELD

This disclosure relates generally to energy source management for a transport climate control system. More specifically, the disclosure relates to methods and systems for managing and controlling power received from different types of utility power sources for a transport climate control system.

BACKGROUND

A transport climate control system can include, for example, a transport refrigeration system (TRS) and/or a heating, ventilation and air conditioning (HVAC) system. A TRS is generally used to control an environmental condition (e.g., temperature, humidity, air quality, and the like) within a cargo space of a transport unit (e.g., a truck, a container (such as a container on a flat car, an intermodal container, etc.), a box car, a semi-tractor, a bus, or other similar transport unit). The TRS can maintain environmental condition(s) of the cargo space to maintain cargo (e.g., produce, frozen foods, pharmaceuticals, etc.). In some embodiments, the transport unit can include a HVAC system to control a climate within a passenger space of the vehicle.

SUMMARY

Regulations such as electrification requirements lead to more electrified system and less reliance on engines. As such, utility power (shore power) is used more often to charge or power the electrified system including, for example, handover (or auxiliary) batteries. In some occasions, when the transport unit crosses country lines, the utility power available in different countries might be different (e.g., some countries might have 220 volts utility power while other countries might have 110 volts utility power).

Typically for a transport climate control system with utility power options available (e.g., users can choose between a 110V utility power plug-in option or a 220V utility power plug-in option), specific factory option needs to be ordered, with the implications of having different electrical components design such as the design of the motor and/or motor protections and installation kit (for example, the design of plug and/or socket) depending on the voltage, phase, and frequency of the utility power and/or the electrical components. The embodiments described herein can allow the users to have a single configuration (e.g., the electrical component design) that can accept either utility power options (110V or 220V (or 230V/460V, 230V/400V, etc.)). The embodiments described herein can allow for connection to different utility power supplies without the need for different electrical components and/or set wiring. It will be appreciated that adaptor plugs or a different connection cord can be used for connection to different utility power supplies (110V or 230V, etc.).

In one embodiment, a transport climate control system is provided. The system includes a passive boost circuit. The system also includes a controller configured to determine whether the passive boost circuit is connected to one of a first utility power and a second utility power. The controller instructs the passive boost circuit to operate in a first configuration when the passive boost circuit is connected to the first utility power and instructs the passive boost circuit to operate in a second configuration when the passive boost circuit is connected to the second utility power. The system further includes a load (e.g., a motor, a standby motor, etc.). The load can drive a device such as a compressor. The load is connected to the passive boost circuit and configured to receive power from the passive boost circuit. When the passive boost circuit is connected to the first utility power, the passive boost circuit is configured to drive the load using a first voltage from the first utility power. When the passive boost circuit is connected to the second utility power, the passive boost circuit is configured to boost a second voltage from the second utility power, and the passive boost circuit is configured to drive the load using the boosted voltage. The first voltage is greater than the second voltage. It will be appreciated that a DC/AC inverter can be used. It will also be appreciated that the passive boost circuit can rectify voltage to drive/power a load such as a DC machine, an Electrically Commutated Motor (ECM), an AC machine such an AC motor (with the DC/AC inverter), etc.

In another embodiment, a method for managing multiple utility power supplies for a transport climate control system is provided. The method includes a controller determining whether the passive boost circuit is connected to one of a first utility power and a second utility power. The method also includes the controller instructing the passive boost circuit to operate in a first configuration when the passive boost circuit is connected to the first utility power and instructing the passive boost circuit to operate in a second configuration when the passive boost circuit is connected to the second utility power. The method further includes the passive boost circuit driving a load using a first voltage from the first utility power when the passive boost circuit is connected to the first utility power. Also the method includes when the passive boost circuit is connected to the second utility power, the passive boost circuit boosting a second voltage from the second utility power and driving the load using the boosted voltage. Further the method includes driving, by the load, a device such as a compressor. The first voltage is greater than the second voltage.

Other features and aspects will become apparent by consideration of the following detailed description and accompanying drawings.

BRIEF DESCRIPTION OF THE DRAWINGS

References are made to the accompanying drawings that form a part of this disclosure and which illustrate the embodiments in which systems and methods described in this specification can be practiced.

FIG. 1A illustrates a side view of a truck with a front wall mounted vehicle powered transport refrigeration unit, according to one embodiment.

FIG. 1B illustrates a schematic cross sectional side view of a refrigerated transport unit with a multi-temp transport refrigeration system, according to one embodiment.

Like reference numbers represent like parts throughout.

DETAILED DESCRIPTION

Figure 1C:
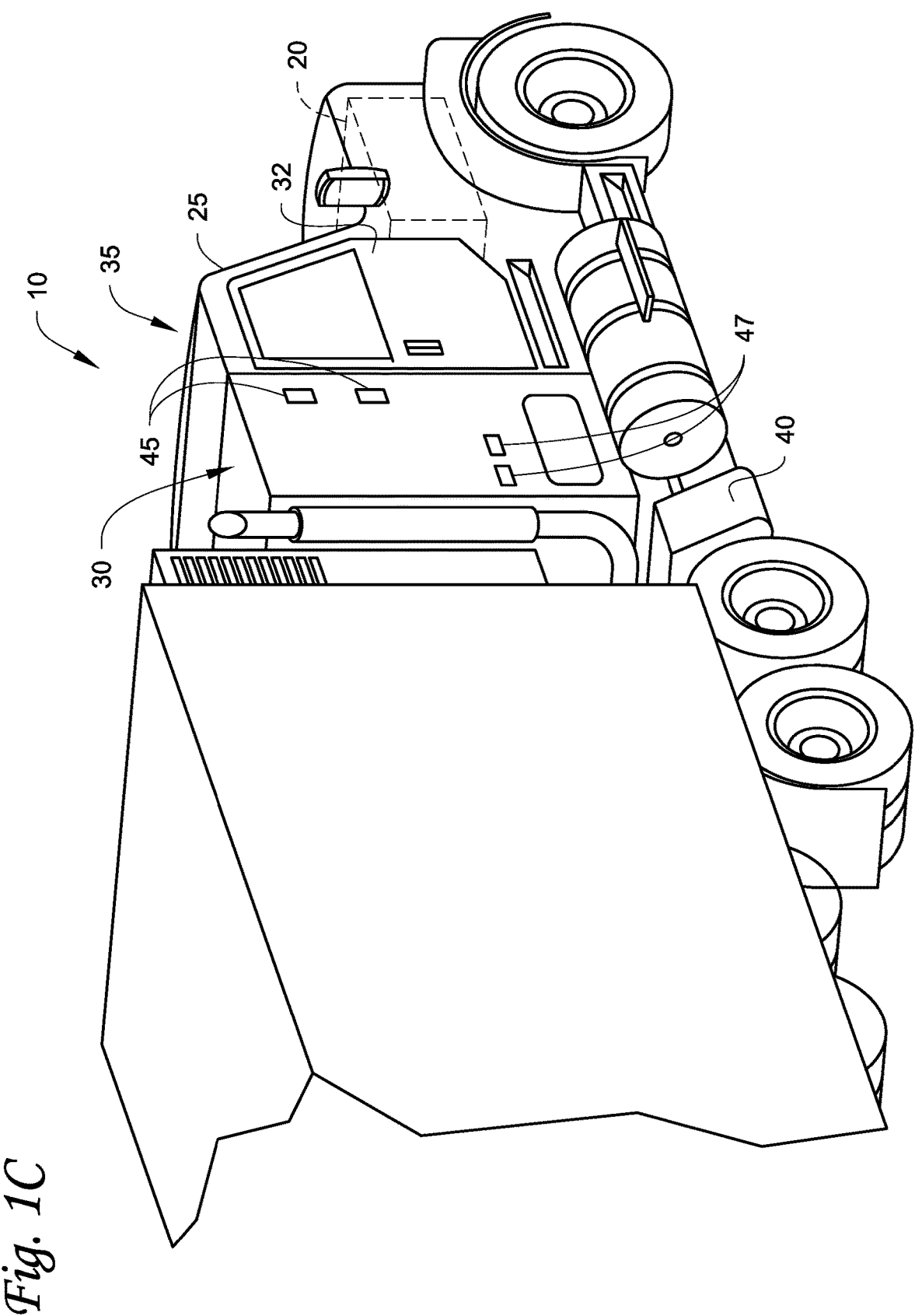
FIG. 1C illustrates a perspective view of a vehicle with an APU, according to one embodiment.

This disclosure relates generally to energy source management for a transport climate control system. More specifically, the disclosure relates to methods and systems for managing and controlling power received from different types of utility power sources for a transport climate control system The embodiments described herein can allow the users to have a single configuration (e.g., the electrical component design) that can accept either utility power options (110V or 220V). In particular, the embodiments described herein can allow for connection to different utility power supplies without the need for different electrical components and/or set wiring.

FIG. 1A depicts a temperature-controlled straight truck 11 that includes a conditioned load space 12 for carrying cargo. A transport refrigeration unit (TRU) 14 is mounted to a front wall 16 of the load space 12. The TRU 14 is controlled via a controller 15 to provide temperature control within the load space 12. The truck 11 further includes a vehicle power bay 18, which houses a prime mover 21, such as a combustion engine (e.g., diesel engine, etc.), that provides power to move the truck 11 and to operate the TRU 14. In some embodiments, the prime mover 21 can work in combination with an optional machine 22 (e.g., an alternator) to operate the TRU 14. In one embodiment, the TRU 14 includes a vehicle electrical system. Also, in some embodiments, the truck 11 can be a hybrid vehicle that is powered by the prime mover 21 in combination with a battery power source or can be an electrically driven truck in which the prime mover 21 is replaced with an electric power source (e.g., a battery power source). In some embodiments, the truck 11 can be an electric vehicle.

While FIG. 1A illustrates a temperature-controlled straight truck 11, it will be appreciated that the embodiments described herein can also apply to any other type of transport unit including, but not limited to, a container (such as a container on a flat car, an intermodal container, etc.), a box car, or other similar transport unit. It will be appreciated that a TRU can use utility power when docked, during loading/unloading, and/or prior loading (to pull down the temperature on the load space).

FIG. 1B illustrates one embodiment of a MTRS 100 for a TU 125 that can be towed, for example, by a tractor (not shown). The MTRS 100 includes a TRU 110 that provides environmental control (e.g. temperature, humidity, air quality, etc.) within an internal space 150 of the TU 125. The MTRS 100 also includes a MTRS controller 170 and one or more sensors (e.g., Hall effect sensors, current transducers, etc.) that are configured to measure one or more parameters (e.g., ambient temperature, compressor suction pressure, compressor discharge pressure, supply air temperature, return air temperature, humidity, etc.) of the MTRS 100 and communicate parameter data to the MTRS controller 170. The MTRS 100 is powered by a power module 112. The TRU 110 is disposed on a front wall 130 of the TU 125. In other embodiments, it will be appreciated that the TRU 110 can be disposed, for example, on a rooftop 126 or another wall of the TU 125.

In some embodiments, the MTRS 100 can include an undermount unit 113. In some embodiments, the undermount unit 113 can be a TRU that can also provide environmental control (e.g. temperature, humidity, air quality, etc.) within the internal space 150 of the TU 125. The undermount unit 113 can work in combination with the TRU 110 to provide redundancy or can replace the TRU 110. Also, in some embodiments, the undermount unit 113 can be a power module that includes, for example, a generator that can help power the TRU 110.

The programmable MTRS Controller 170 may comprise a single integrated control unit or may comprise a distributed network of TRS control elements. The number of distributed control elements in a given network can depend upon the particular application of the principles described herein. The MTRS controller 170 is configured to control operation of the MTRS 100.

As shown in FIG. 1B, the power module 112 is disposed in the TRU 110. In other embodiments, the power module 112 can be separate from the TRU 110. Also, in some embodiments, the power module 112 can include two or more different power sources disposed within or outside of the TRU 110. In some embodiments, the power module 112 can include one or more of a prime mover, a battery, an alternator, a generator, a solar panel, a fuel cell, utility power, etc. Also, the prime mover can be a combustion engine or a microturbine engine and can operate as a two speed prime mover, a variable speed prime mover, etc. The power module 112 can provide power to, for example, the MTRS Controller 170, a compressor (not shown), a plurality of DC (Direct Current) components (not shown), a power management unit (not shown), etc. The DC components can be accessories or components of the MTRS 100 that require DC power to operate. Examples of the DC components can include, for example, DC fan motor(s) for a condenser fan or an evaporator blower (e.g., an Electrically Commutated Motor (ECM), a Brushless DC Motor (BLDC), etc.), a fuel pump, a drain tube heater, solenoid valves (e.g., controller pulsed control valves), etc.

The power module 112 can include a DC power source (not shown) for providing DC electrical power to the plurality of DC components (not shown), the power management unit (not shown), etc. The DC power source can receive mechanical and/or electrical power from, for example, a utility power source (e.g., Utility power, etc.), a prime mover (e.g., a combustion engine such as a diesel engine, etc.) coupled with a generator machine (e.g., a belt-driven alternator, a direct drive generator, etc.), etc. For example, in some embodiments, mechanical energy generated by a diesel engine is converted into electrical energy via a generator machine. The electrical energy generated via the belt driven alternator is then converted into DC electrical power via, for example, a bi-directional voltage converter. The bi-directional voltage converter can be a bi-directional multi-battery voltage converter.

The internal space 150 can be divided into a plurality of zones 152. The term "zone" means a part of an area of the internal space 150 separated by walls 175. It will be appreciated that the invention disclosed herein can also be used in a single zone TRS.

The MTRS 100 for the TU 125 includes the TRU 110 and a plurality of remote evaporator units 180. In some embodiments, an HVAC system can be powered by an Auxiliary Power Unit (APU, see FIGS. 1C and 1D). The APU can be operated when a main prime mover of the TU 125 is turned off such as, for example, when a driver parks the TU 125 for an extended period of time to rest. The APU can provide, for example, power to operate a secondary HVAC system to provide conditioned air to a cabin of the TU 125. The APU can also provide power to operate cabin accessories within the cabin such as a television, a microwave, a coffee maker, a refrigerator, etc. The APU can be a mechanically driven APU (e.g., prime mover driven) or an electrically driven APU (e.g., battery driven).

The tractor includes a vehicle electrical system for supplying electrical power to the electrical loads of the tractor, the MTRS 100, and/or the TU 125.

FIG. 1C illustrates a vehicle 10 according to one embodiment. The vehicle 10 is a semi-tractor that is used to transport cargo stored in a cargo compartment (e.g., a container, a trailer, etc.) to one or more destinations. Hereinafter, the term "vehicle" shall be used to represent all such tractors and trucks, and shall not be construed to limit the invention's application solely to a tractor in a tractor-trailer combination. In some embodiments, the vehicle 10 can be, for example, a straight truck, van, etc.

The vehicle 10 includes a primary power source 20, a cabin 25 defining a sleeping portion 30 and a driving portion 35, an APU element (hereinafter referred to as APU) 40, and a plurality of vehicle accessory components 45 (e.g., electronic communication devices, cabin lights, a primary and/or secondary HVAC system, primary and/or secondary HVAC fan(s), sunshade(s) for a window/windshield of the vehicle 10, cabin accessories, etc.). The cabin 25 can be accessible via a driver side door (not shown) and a passenger side door 32. The cabin 25 can include a primary HVAC system (not shown) that can be configured to provide conditioned air within driving portion 35 and potentially the entire cabin 25, and a secondary HVAC system (not shown) for providing conditioned air within the sleeping portion 30 of the cabin 25. The cabin 25 can also include a plurality of cabin accessories (not shown). Examples of cabin accessories can include, for example, a refrigerator, a television, a video game console, a microwave, device charging station(s), a continuous positive airway pressure (CPAP) machine, a coffee maker, a secondary HVAC system for providing conditioned air to the sleeping portion 30.

The primary power source 20 can provide sufficient power to operate (e.g., drive) the vehicle 10 and any of the plurality of vehicle accessory components 45 and cabin accessory components 47. The primary power source 20 can also provide power to the primary HVAC system and the secondary HVAC system. In some embodiments, the primary power source can be a prime mover such as, for example, a combustion engine (e.g., a diesel engine, etc.).

The APU 40 is a secondary power unit for the vehicle 10 when the primary power source 20 is unavailable. When, for example, the primary power source 20 is unavailable, the APU 40 can be configured to provide power to one or more of the vehicle accessory components, the cabin accessories, the primary HVAC system and the secondary HVAC system. In some embodiments, the APU 40 can be an electric powered APU. In other embodiments, the APU 40 can be a prime mover powered APU. The APU 40 can be attached to the vehicle 10 using any attachment method. In some embodiments, the APU 40 can be turned on (i.e., activated) or off (i.e., deactivated) by an occupant (e.g., driver or passenger) of the vehicle 10. The APU 40 generally does not provide sufficient power for operating (e.g., driving) the vehicle 10. The APU 40 can be controlled by an APU controller 41.

Figure 1D:
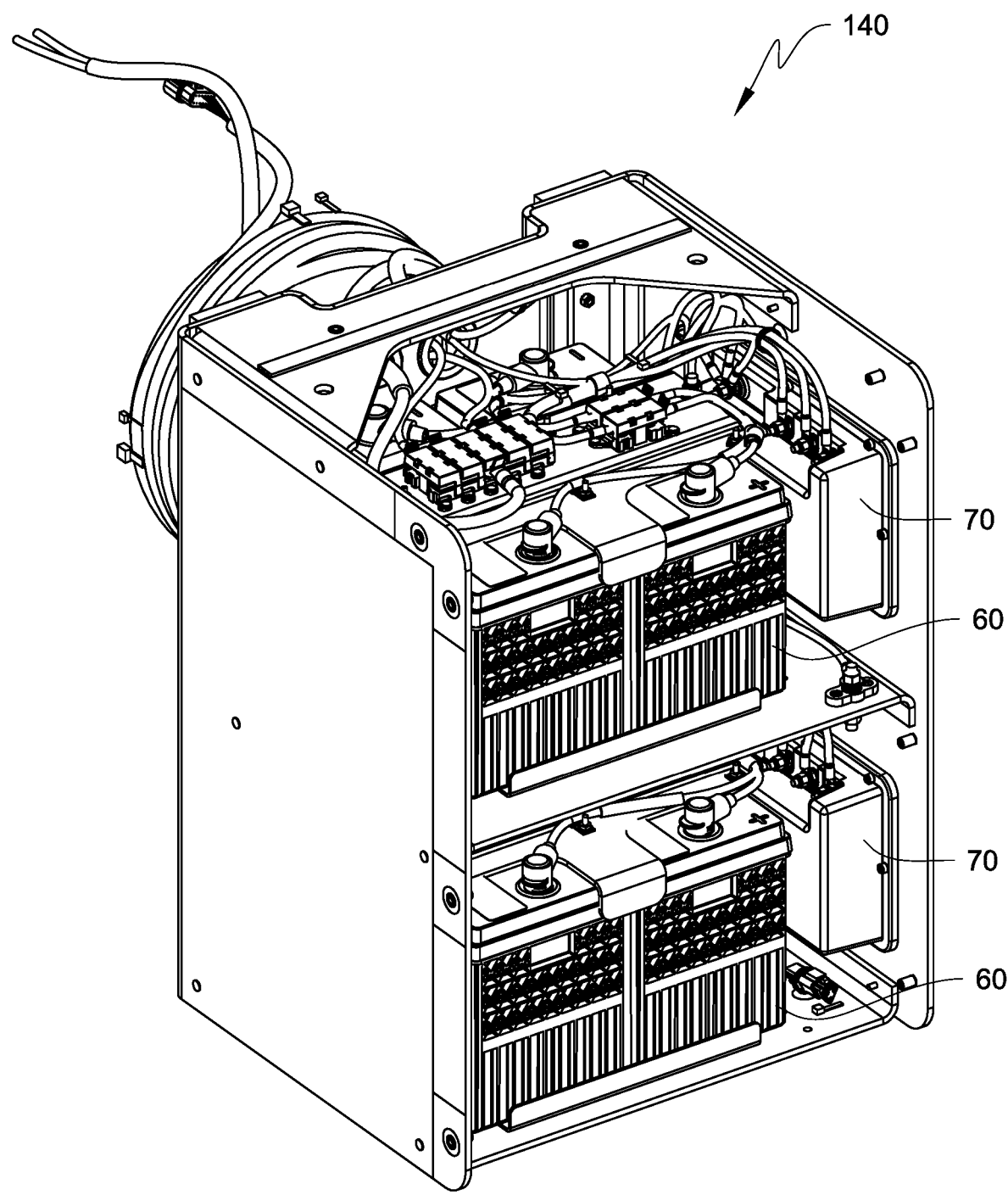
FIG. 1D illustrates a front perspective view of an APU, according to one embodiment.

FIG. 1D illustrates an APU (such as an electric APU) 140 that can be used with a vehicle (e.g., the vehicle 10 shown in FIG. 1C), according to one embodiment. It will be appreciated that the APU 140 can be a diesel APU. The APU 140 includes a plurality of energy storage elements 60 each of which is coupled to one of a plurality of converters 70. The converters 70 can provide electric power (e.g., AC or DC power) generated by the APU 140 to one or more vehicle accessory components, cabin accessory components, a primary HVAC system, and a secondary HVAC system. A secondary HVAC system can provide conditioned air to a sleeping portion of a vehicle cabin (e.g., the sleeping portion 30 of the cabin 25 shown in FIG. 1C). The energy storage elements 60 can be, for example, battery packs, fuel cells, etc. In some embodiments, the APU 140 can be turned on or off by an occupant (e.g., driver or passenger) of the vehicle. For example, the occupant can turn on the APU 140 to provide power stored in the energy storage elements 60 when a primary power source of the vehicle is turned off. It will be appreciated that the embodiments described herein can also be used with a prime mover powered APU.

In some embodiments, the APU (e.g., the APU 40 as shown in FIG. 1C and/or the APU 140 as shown in FIG. 1D) includes a vehicle electrical system.

Figure 1E:
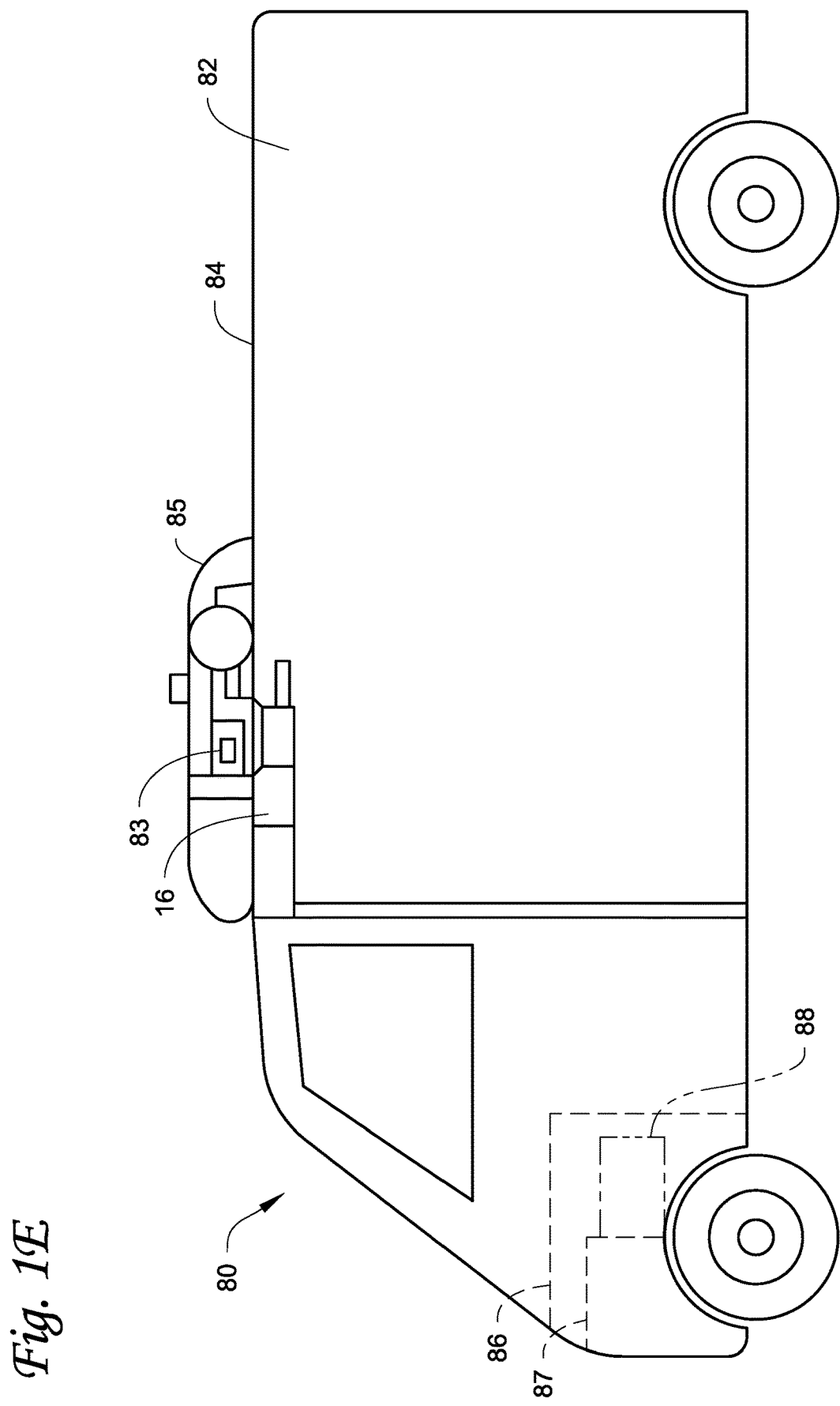
FIG. 1E illustrates a side view of a van with a roof mounted vehicle powered transport refrigeration unit, according to one embodiment.

FIG. 1E depicts a temperature-controlled van 80 that includes a conditioned load space 82 (or internal space) for carrying cargo. A transport refrigeration unit (TRU) 85 is mounted to a rooftop 84 of the load space 82. The TRU 85 is controlled via a controller 83 to provide temperature control within the load space 82. The van 80 further includes a vehicle power bay 86, which houses a prime mover 87, such as a combustion engine (e.g., diesel engine, etc.), that provides power to move the van 80 and to operate the TRU 85. In some embodiments, the prime mover 87 can work in combination with an optional machine 88 (e.g., an alternator) to operate the TRU 85. In one embodiment, the TRU 85 includes a vehicle electrical system. Also, in some embodiments, the van 80 can be a hybrid vehicle that is powered by the prime mover 87 in combination with a battery power source or can be an electrically driven truck in which the prime mover 87 is replaced with an electric power source (e.g., a battery power source).

Figure 2A:
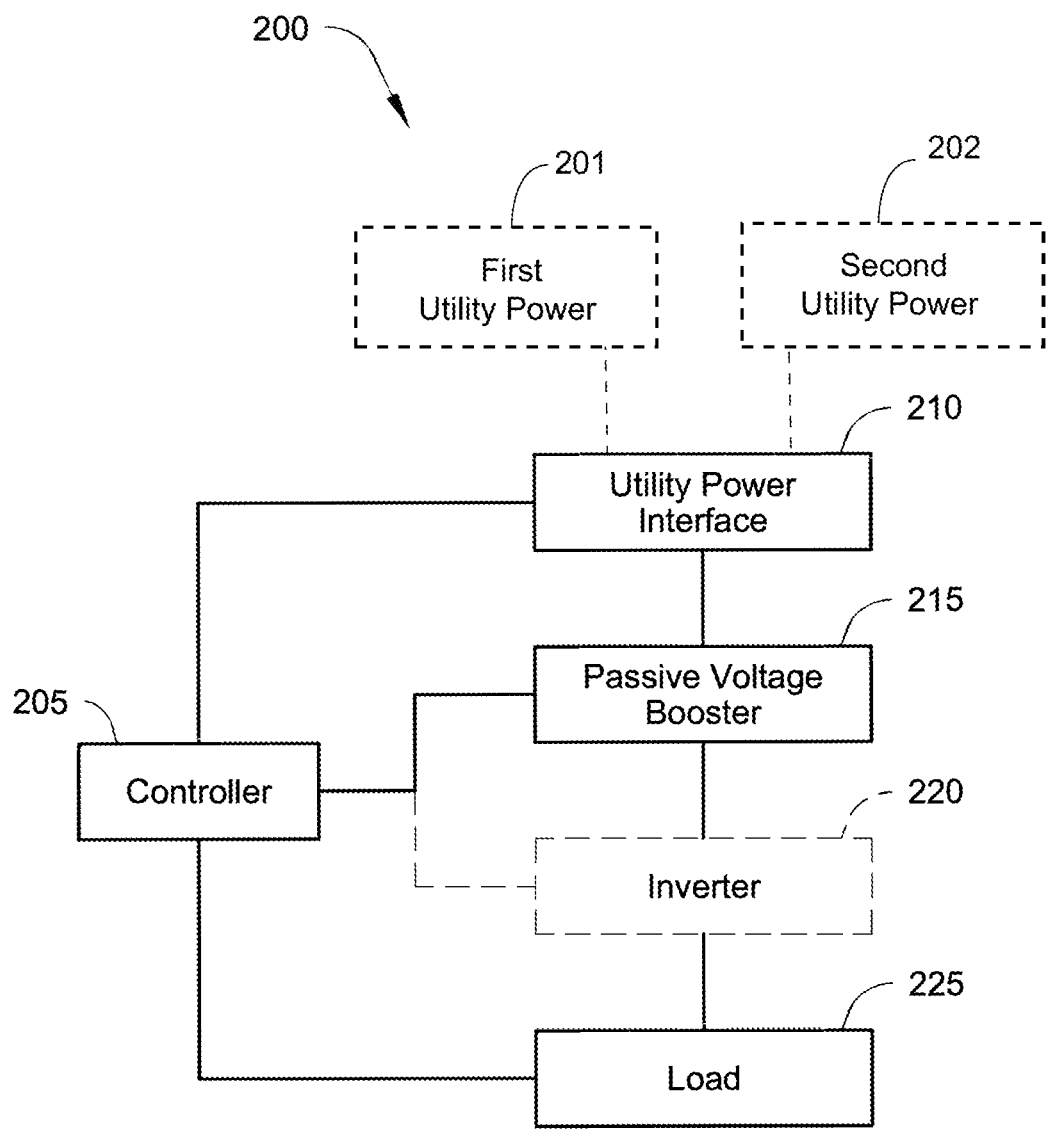
FIG. 2A illustrates a block diagram schematic of a reconfigurable utility power input system for a transport climate control system, according to one embodiment.

FIG. 2 illustrates a block diagram schematic of a reconfigurable utility power input system 200 for a transport climate control system, according to one embodiment.

As shown in FIG. 2, the system 200 includes a controller 205. The controller 205 can be any one of the controllers of FIGS. 1A-1E. The system 200 also includes a utility power interface 210. The utility power interface 210 can interface with a utility power (201, 202) so that the utility power (201, 202) can provide power (e.g., charging and/or powering) to the system 200. The system 200 further includes a passive voltage booster 215. The passive voltage booster 215 accepts input voltage from the utility power (201, 202) via the utility power interface 210. In one embodiment, the system 200 can include a voltage sensor (not shown). The controller 205 can measure the input voltage from the utility power (201, 202), via, for example, the voltage sensor. Depending on the input voltage from the utility power (201, 202), the controller 205 can control/configure the passive voltage booster 215 to boost (or not to boost) the input voltage from the utility power (201, 202).

The passive voltage booster 215 outputs voltage to a load 225 of the system 200. The load 225 can be a DC load or an AC load. In one embodiment, the outputted voltage from the passive voltage booster 215 is a rectified voltage, and the rectified voltage can be used to drive, for example, a DC load 225 (e.g., a DC motor drive that drives a compressor). In another embodiment, the outputted voltage from the passive voltage booster 215 is a rectified voltage, and the rectified voltage can be used to drive, for example, an AC load 225 (e.g., a variable speed electric machine, an AC motor drive that drives a compressor, a compressor, a motor, a motor fan, etc.) via an inverter 220. The controller 205 can control and/or configure the inverter 220 and/or the load 225. It will be appreciated that in an embodiment, when the load 225 is a DC load (e.g., an Electrically Commutated Machine "ECM"), the system 200 does not have the 220 inverter (or the 220 inverter is bypassed). In such embodiment, a DC/DC boost converter might be needed if a voltage from the passive voltage booster 215 is not adequate to drive the load.

In one embodiment, the load 225 can be, for example, a compressor motor. The compressor can be a variable speed (e.g., two-speed) compressor, or a variable load compressor. For a variable load compressor, an electric throttle valve (ETV) can be used to unload the compressor without changing the compressor speed, by for example, controlling the amount of refrigerant that goes into the compressor. It will be appreciated that expansion valve (EV) can also be used to control the amount of refrigerant that goes into the evaporator, which by nature controls the amount of refrigerant that goes back into the compressor.

Typically a compressor is designed and wired to work with a specific voltage. For example, some compressors are made to be driven by, 220V or 230V input voltage. When a compressor is operating at a high speed, the associated back electromotive force (i.e., back EMF, or counter-electromotive force) can be approaching that specific voltage. For example, for a 230V compressor, when the compressor is operating at a certain high speed, the associated back EMF can be at about 190V (approaching 230V). Such back EMF (e.g., 190V) is incompatible with the 110V input voltage (i.e., the 230V compressor cannot operate under a 110V input voltage)—current cannot be fed from a low voltage source into a higher voltage.

As such, for a 230V compressor, if there is only 110V utility power available, the compressor cannot operate sufficiently with the utility power, without a reconfigurable voltage booster. In such a case, users may have to choose a specific input voltage (for a specific utility power), and choose different motors and/or other electrical components to satisfy the specific input voltage (i.e., the system has to be designed for specific utility power options, and once the system built, users cannot change to another configuration easily). If, for example, a motor (e.g., for a compressor) is run at the lower (input) voltage that it is designed to, the motor may be limited to a sub-optimal speed. At the sub-optimal speed, the performance of the refrigeration system can also be limited. If the (input) voltage can be boosted, then the motor can achieve the higher end of its speed range, because the (input) voltage is above the elevated back EMF. It will be appreciated that compressor's operational speed is limited when the compressor is operating from, for example, a single phase low input voltage. The compressor is still able to keep running at reduced power. Extra voltage is needed to meet the back EMF requirement of a machine (e.g., a motor) to spin the compressor at a high enough speed. It will be appreciated that in one embodiment, an active booster circuit such as a DC/DC converter boost circuit or an inverter with a boost inductor can be used to boost the input voltage.

In operation, the controller 205 can determine the working voltage of the load 225 (e.g., a compressor motor), via for example, a sensor (not shown). The controller 205 can also measure the input voltage from the utility power interface (eventually from the utility power), via for example, a voltage sensor (not shown). The input voltage from the utility power can be, for example, 110 VAC single phase, 120 VAC single phase, 220 VAC single phase, 240 VAC single phase, 230 VAC three-phase, 460 VAC three-phase, etc. It will be appreciated that for three-phase input, it is likely there is already enough power (i.e., the power is less an issue for system operation). It will also be appreciated that the implementation (of the passive voltage booster 215) would be the same/similar for single phase and three-phase inputs, where the three-phase input would need more diodes and more capacitors.

If the controller 205 determines that the input voltage from the utility power is not high enough to drive/power the load 225 (e.g., the input voltage cannot meet the back EMF requirement for the compressor to run at a certain speed), the controller 205 can control the passive voltage booster 215 to boost the input voltage from the utility power to drive/power the load 225 (i.e., to activate/enable the passive voltage booster 215). If the controller 205 determines that the input voltage from the utility power is enough to drive/power the load 225, the controller 205 can control the passive voltage booster 215 to not boost the input voltage from the utility power (i.e., to deactivate/disable the passive voltage booster 215).

In one embodiment, the passive voltage booster 215 can be a passive voltage doubler. In another embodiment, the passive voltage booster 215 can be a passive voltage tripler. In yet another embodiment, the passive voltage booster 215 can be a passive voltage quadrupler.

Figure 2B:
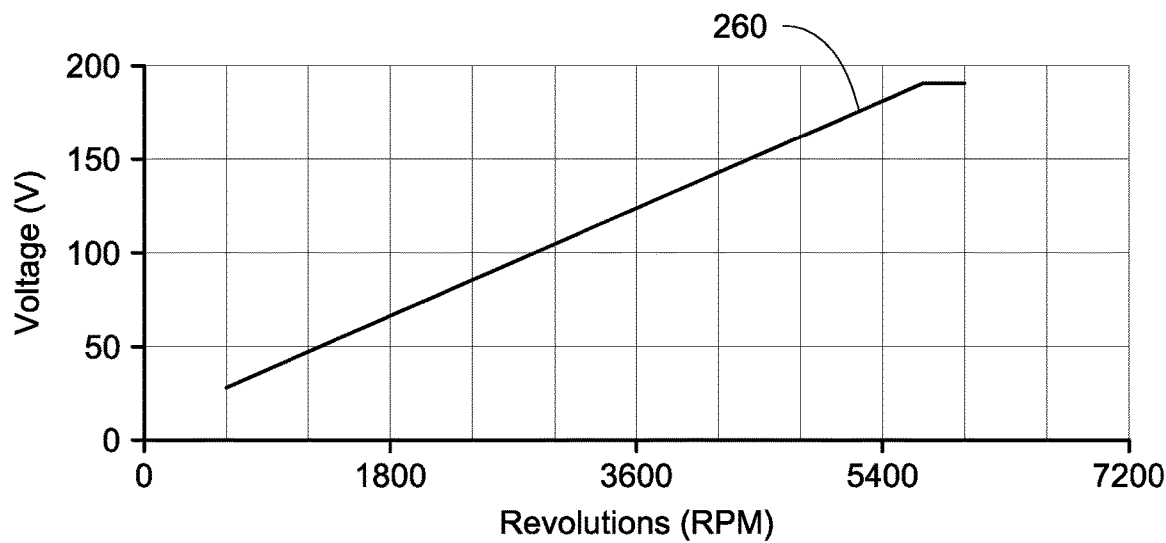
FIG. 2B illustrates a relation map between a back EMF voltage and a speed of a device, according to one embodiment.

FIG. 2B illustrates a relation map 260 between a back EMF voltage and a speed of a device, according to one embodiment. In such embodiment, the device can be, for example, a compressor, a fan, etc. As shown in FIG. 2B, the horizontal coordinate represents a speed of the device. The vertical coordinate represents the back EMF voltage (unit volts) corresponding to the speed (e.g., unit "Revolution per Minute") of the device. In such embodiment, the device can be, for example, a 230V AC/DC (or 460V AC/DC, etc.) compressor or fan, etc. It will be appreciated that in FIG. 2B, when the speed is lower than a certain speed (e.g., at or around 5700 RPM), the relation between the speed and the back EMF voltage is defined by a velocity constant. When the speed of the device exceeds the certain speed, the corresponding back EMF voltage can be constant (e.g., at or about 190V), for a 230V compressor or fan, etc.

Figure 2C:
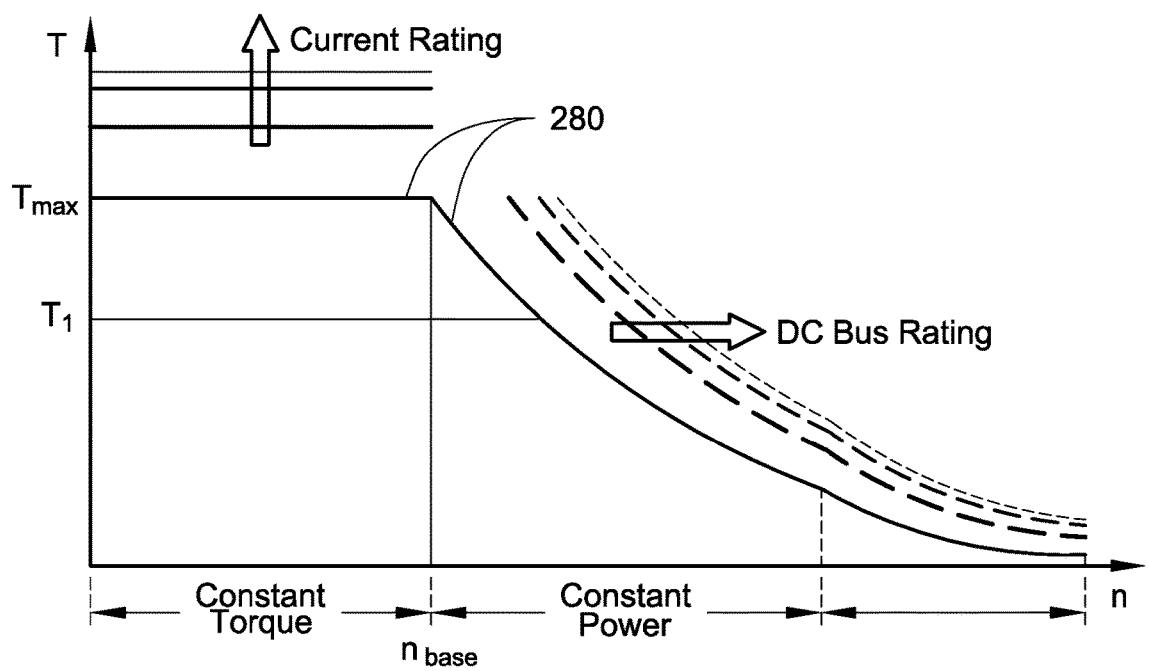
FIG. 2C illustrates an operational curve of a device, according to one embodiment.

FIG. 2C illustrates an operational curve 280 of a device, according to one embodiment. In such embodiment, the device can be, for example, a compressor, a fan, etc. As shown in FIG. 2C, the operational curve 280 represents an operation boundary of the device. When a DC bus voltage is boosted (e.g., via the passive voltage booster 215 of FIG. 2A), the operational curve can be shifted right and the device can be operated with a higher speed and/or torque (see the horizontal arrow that shifts the operational curve 280 to the right (to dotted curves)).

Figure 3A:
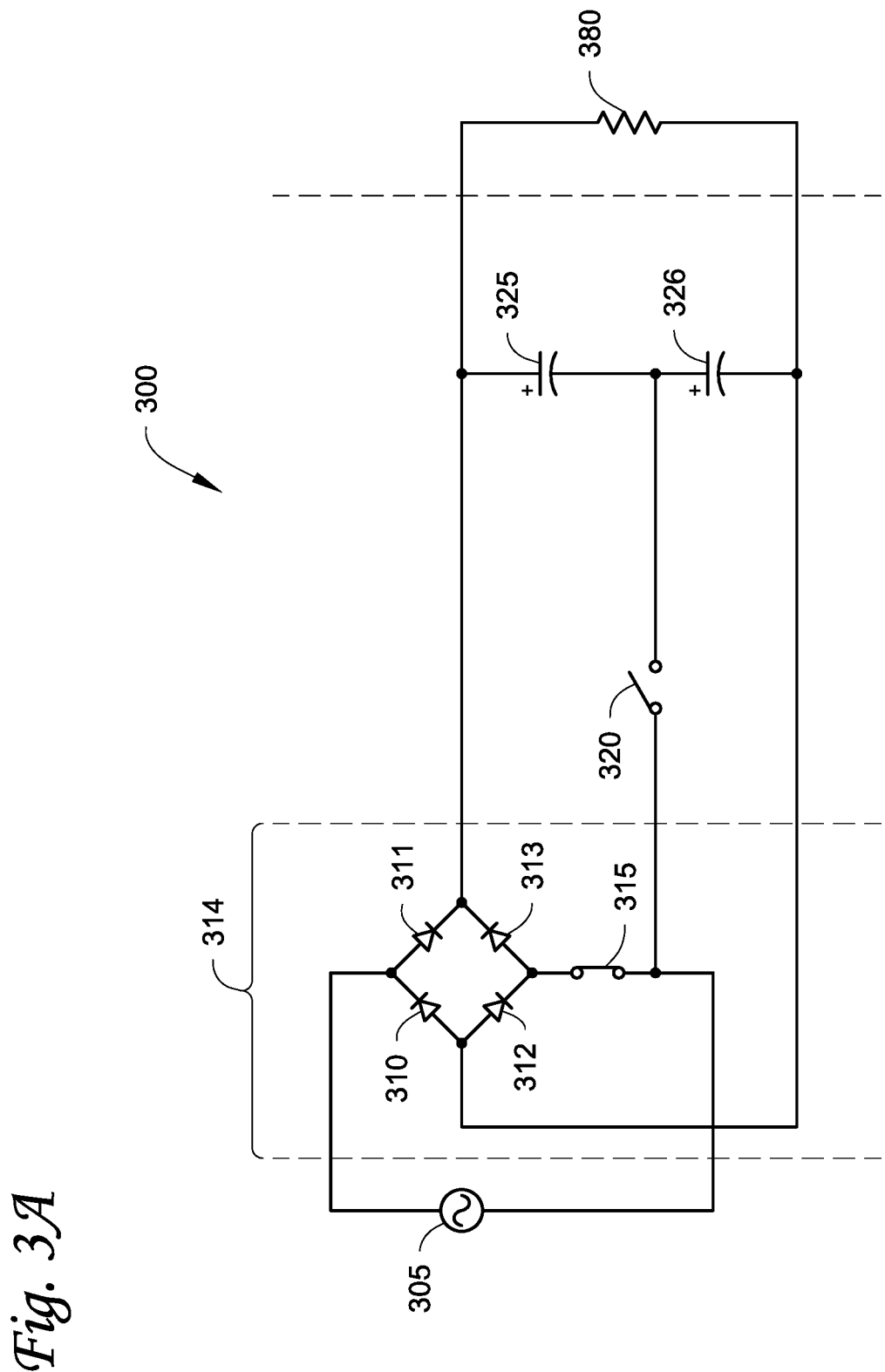
FIG. 3A illustrates a deactivated passive voltage booster circuit 300, according to one embodiment.

FIG. 3A illustrates a deactivated passive voltage booster circuit 300, according to one embodiment. It will be appreciated that the deactivated passive voltage booster circuit 300 can be defined as a passive rectifier circuit without a voltage multiplier/booster configuration.

It will be appreciated that "passive voltage booster circuit" refers to a booster circuit that only includes passive elements. A passive element is an electrical component that does not generate power, but instead dissipates, stores, and/or releases power. Passive elements include resistors, capacitors, inductors, transformers (can increase a voltage or current but cannot increase the power), diodes (when they do not have a negative differential resistance) etc. It will also be appreciated that "passive voltage booster circuit" means that the booster circuit does not include any active elements. Active elements are elements that supply power to the circuit. Active elements include, for example, voltage and current sources, generators, transistors, etc. For example, unlike, an active voltage booster circuit, a passive voltage booster circuit does not include transistor(s) or MOSFET(s).

As shown in FIG. 3A, the passive voltage booster circuit 300 includes a passive rectifier. The passive rectifier 314 includes diodes 310, 311, 312, and 313. The booster circuit 300 also includes configuration switches 315 and 320. It will be appreciated that the switches can be relays and/or contactors. The booster circuit 300 further includes capacitors 325 and 326. A power source 305 (not part of booster circuit 300) can supply power to the booster circuit 300. The booster circuit 300 can output power to a load 380 (not part of booster circuit 300).

In FIG. 3A, a first end of the power source 305 connects to a second end of the diode 310 and a first end of the diode 311. A second end of the power source 305 connects a first end of the switch 315. A second end of the switch 315 connects to a second end of the diode 312 and a first end of the diode 313. A second end of the diode 311 and a second end of the diode 313 connects to a first end of the capacitor 325 and a first end of the load 380. A first end of the diode 310 and a first end of the diode 312 connects to a second end of the capacitor 326 and a second end of the load 380. The first end of the switch 315 and the second end of the power source 305 connect to a first end of the switch 320. A second end of the switch 320 connects to a second end of the capacitor 325 and a first end of the capacitor 326.

A controller (such as the controller 205 of FIG. 2) can control the switches 315 and 320. If the controller determines (e.g., via a voltage sensor) that the input voltage (e.g., 220 VAC or 230 VAC) from the utility power is enough to drive/power the load (e.g., factory standard electric motor, such as 230 VAC/460 VAC compressor motor), the controller 205 can control the passive voltage booster 300 to not boost the input voltage from the utility power (i.e., to deactivate/disable the passive voltage booster 300). I.e., the passive voltage booster circuit 300 is deactivated by the controller via the switches 315 and 320. As shown in FIG. 3A, the switch 315 is closed (connected, on) and the switch 320 is open (disconnected, off).

It will be appreciated that the passive voltage booster circuit 300 in FIG. 3A is a passive voltage doubler. The passive voltage doubler is deactivated by, for example, a controller (such as the controller 205 of FIG. 2) that instructs the switch 315 to close and instructs the switch 320 to open. In such a case, when the input voltage from the power source 305 is Vin (root mean square value), the output voltage to the load 380 can be rectified Vin (referred to as Vlink=Vin*sqrt(2)). The controller (such as the controller 205 of FIG. 2) can control the passive voltage booster circuit 300 to not boost (not to double in this case) the rectified Vin. It will be appreciated that the diodes (e.g., diodes 310, 311, 312, and 313) may drop some voltage but the drop would generally be considered insignificant. It will be appreciated that the rectified Vin is stable voltage and can supply a DC link for a compressor drive module (CDM).

It will be appreciated that the circuit 300 can be sized such that the capacitance values of the capacitors (e.g., capacitors 325 and/or 326) are the same as other capacitors (e.g., start and run capacitors) used in the transport climate control system. It will also be appreciated that such types of capacitors cost significantly less. It will be appreciated that passive voltage boosters are not usually used in the transport climate control industry because they are not as reliable (e.g., because the capacitors used in passive voltage boosters are not reliable and need to be replaced). It will be appreciated that in the embodiments described herein, the capacitors (such as capacitors 325 and/or 326) in the passive voltage booster can be of large size and/or of large capacitance (e.g., at about 10 mf or more). Such types of capacitors can have a reduced reliability and can be considered as maintenance items. For example, the capacitors (such as capacitors 325 and/or 326) can be at about 15,000 uf (15 mf). It will be appreciated that the use of such types of capacitors in the passive voltage booster add negligible maintenance to users (i.e., such capacitors being included in a serviceable portion of the vehicle having the transport climate control system) but significantly reduced the manufacturing cost compared with other solutions (such as using MOSFETs in active voltage booster, etc.).

It will be appreciated that the passive voltage booster circuit 300 can be beneficial for a low cost market. In one mode (either a boost mode or a non-boost mode), passive switches (such as the switches 315 and 320) can be completely digital (i.e., on or off only, no Pulse Width Modulation). Unlike active booster circuits in which MOSFET switches are typically used the passive voltage booster circuit 300 is not required to switch actively during one mode (either a boost mode or a non-boost mode), has a lower manufacturing cost, does not require extra controlling of any MOSFET switches by the controller, and does not require frequent on/off switching of any accessories. The passive voltage booster circuit can, opposed to an active voltage booster circuit, be cost effective and can provide high voltage DC links for inverters without switching losses.

Figure 3B:
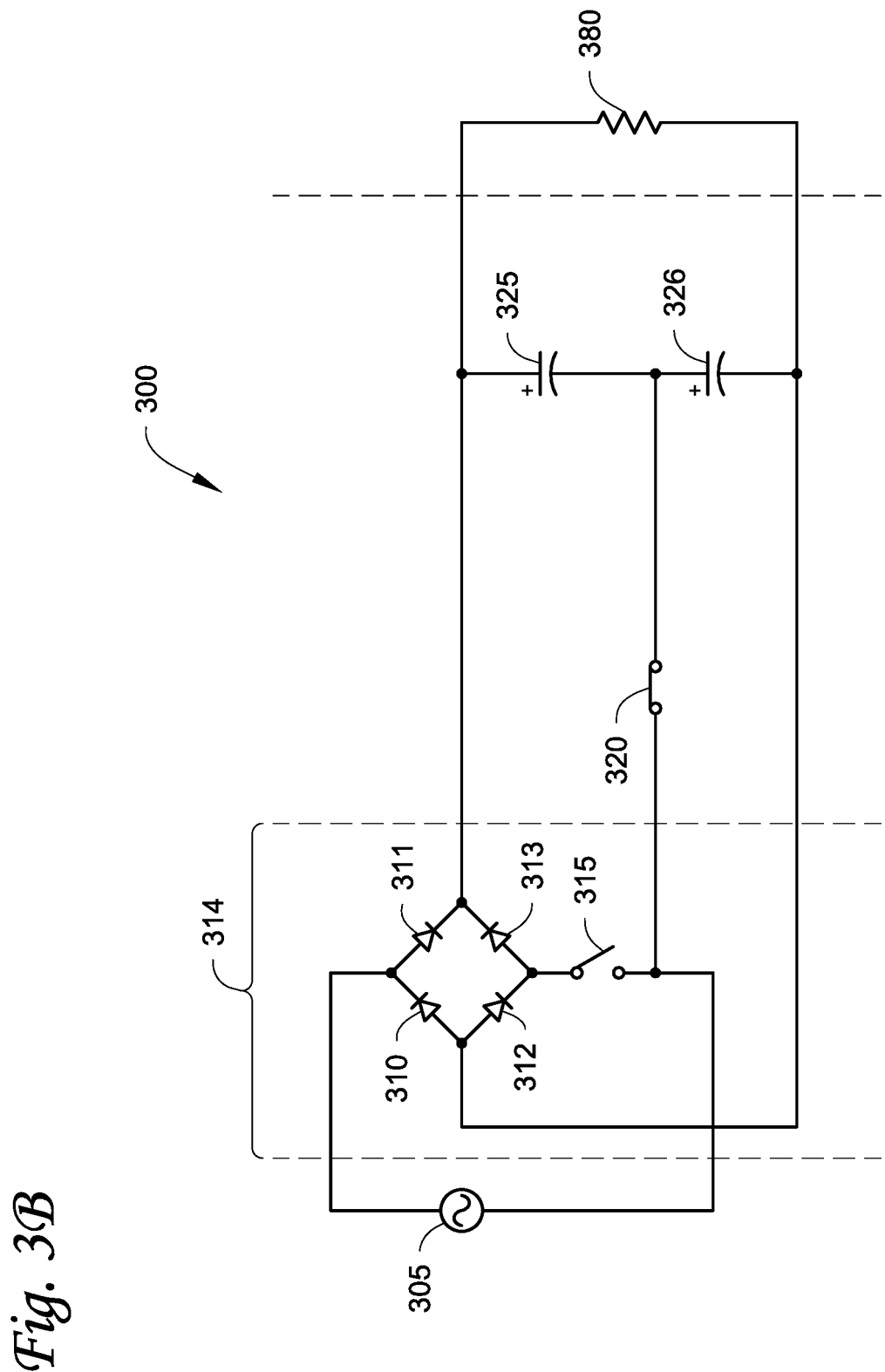
FIG. 3B illustrates an activated passive voltage booster circuit 300, according to one embodiment.

FIG. 3B illustrates the activated passive voltage booster circuit 300 in an activated configuration. It will be appreciated that the activated passive voltage booster circuit 300 can be defined as a passive rectifier circuit with a voltage multiplier/booster configuration. The booster circuit 300 is the same as the booster circuit 300 shown in FIG. 3A, except that the switch 315 is open and the switch 320 is closed.

It will be appreciated that the passive voltage booster circuit 300 in FIG. 3B is a passive voltage doubler. The passive voltage doubler is activated by, for example, a controller (such as the controller 205 of FIG. 2) by opening switch 315 and closing switch 320. In such a case, when the input voltage from the power source 305 is Vin, the output voltage to the load 380 can be a doubled rectified Vin (referred to as Vlink=Vin*sqrt(2)*2). The controller (such as the controller 205 of FIG. 2) can control the passive voltage booster circuit 300 to boost (double in this case) the rectified Vin.

It will also be appreciated that if the controller determines that the input voltage (e.g., 110 VAC or 120 VAC) from the utility power is not high enough to drive/power the load (e.g., the input voltage cannot meet the back EMF requirement for the 230V/460V three-phase compressor/motor to run at a certain speed), the controller can control the passive voltage booster 300 to boost the input voltage from the utility power to drive/power the load (i.e., to activate/enable the passive voltage booster via the switches 315 and 320).

It will be appreciated that when the voltage is boosted, since the power (e.g., the input power from the utility power) is constant, the output current from the passive voltage booster circuit 300 can be lower compared with the input current (e.g., from the utility power). In such case, the load 380 (e.g., a compressor motor) can still run but might not be capable of running in its full capacity (i.e., run with a reduced operation such as reduced load and/or speed) when for example, the transport climate control system is connected to a low voltage utility power and the voltage is boosted. In such a case, the transport climate control system may not have any ability to charge the auxiliary (holdover) battery or the like, when for example, the transport climate control system is connected to a low voltage utility power and the voltage is boosted. It will also be appreciated that without boosting the voltage, the load 380 (e.g., a compressor motor) might not run at all when, for example, the transport climate control system is connected to a low voltage utility power (i.e., the voltage is not high enough to run/power the load).

Figure 4A:
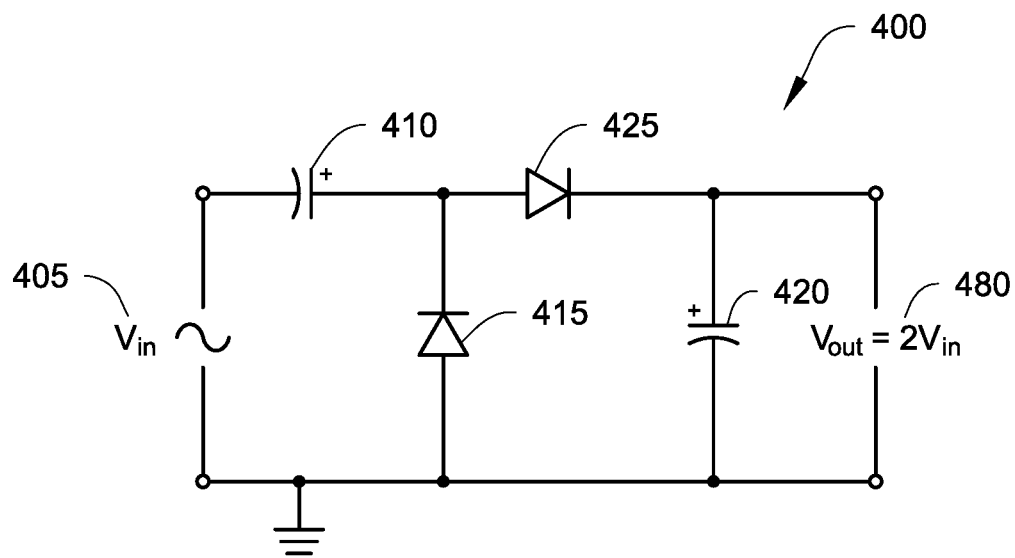
FIGS. 4A and 4B illustrates other embodiments of a passive voltage booster circuit (doubler), according to one embodiment.
Figure 4B:
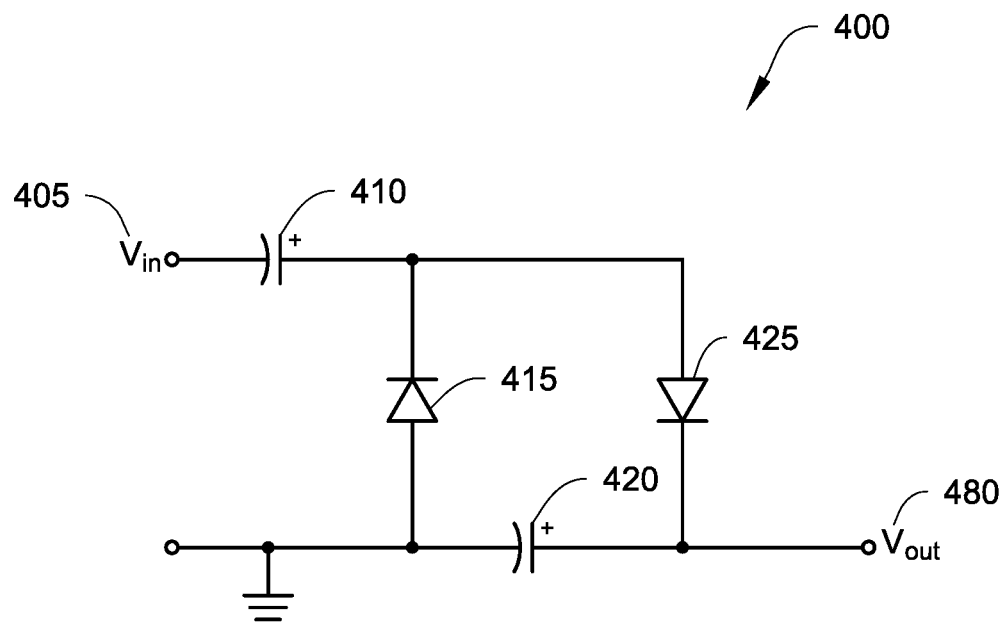

FIGS. 4A and 4B illustrates other embodiments of a passive voltage booster circuit 400 configured to double an input voltage Vin (also referred to as a doubler circuit), according to one embodiment.

As shown in FIGS. 4A and 4B, the passive voltage booster circuit 400 includes capacitors 410 and 420. It will be appreciated that the capacitors 410 and 420 can be the same as (or similar to) the capacitors 325 and 326 of FIGS. 3A and 3B. The circuit 400 also includes diodes 415 and 425. The circuit 400 is connected to a power source 405 that supplies the input voltage Vin. The output voltage Vout 480 of the circuit 400 is equal to 2 times Vin. It will also be appreciated that FIGS. 4A and 4B are the same circuit being drawn in different ways.

Figure 5A:
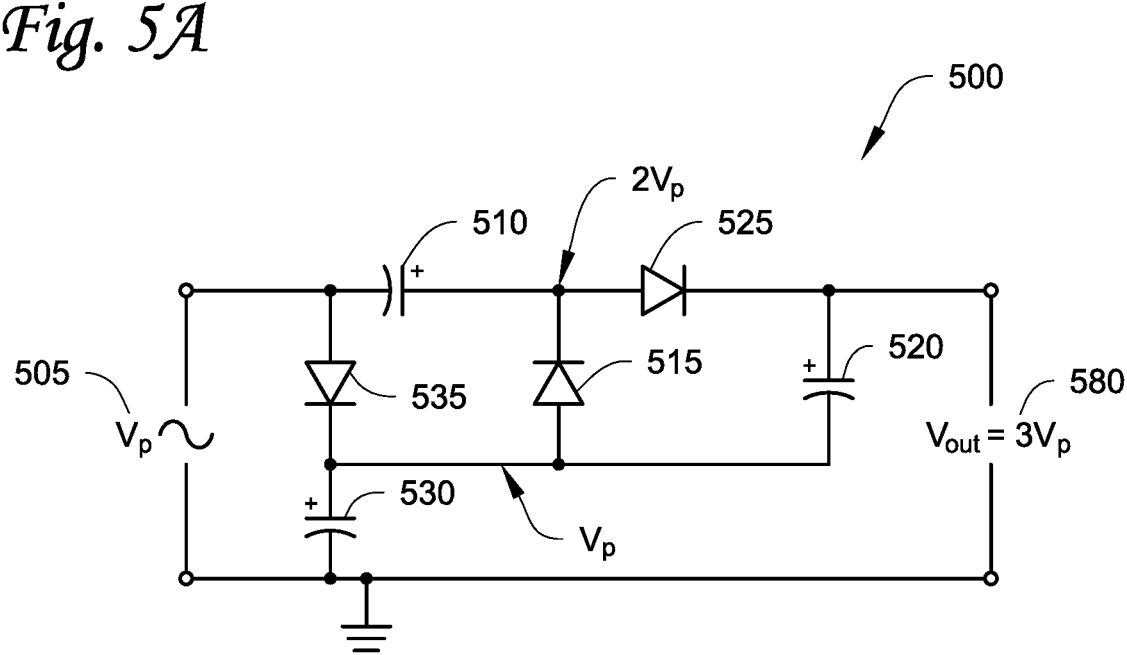
FIGS. 5A and 5B illustrates embodiments of a passive voltage booster circuit (tripler), according to one embodiment.
Figure 5B:
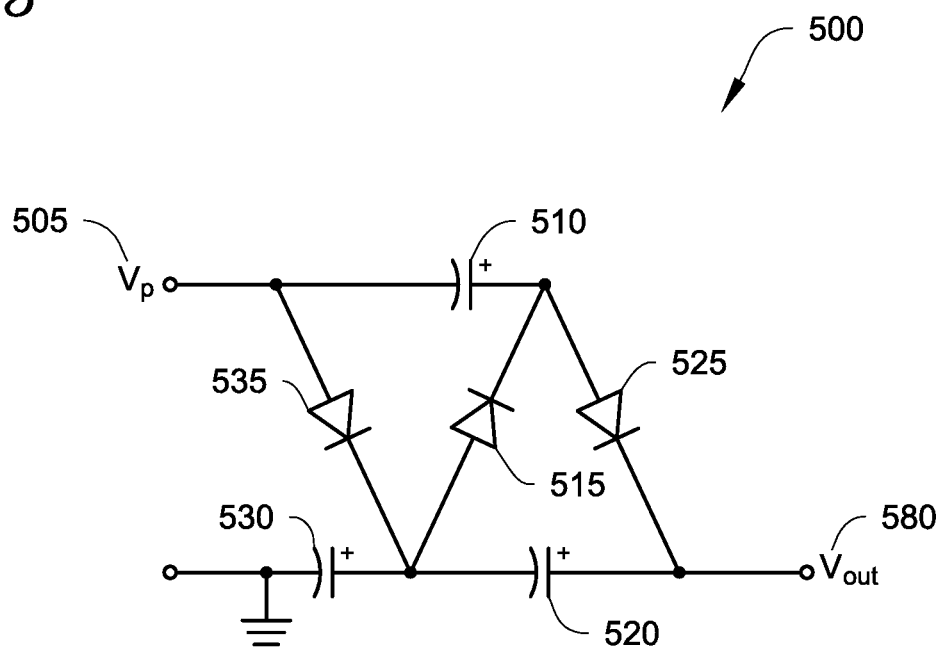

FIGS. 5A and 5B illustrates embodiments of a passive voltage booster circuit 500 configured to triple an input voltage Vp (also referred to as a tripler circuit), according to one embodiment.

As shown in FIGS. 5A and 5B, the passive voltage booster circuit 500 includes capacitors 510, 520, and 520. It will be appreciated that the capacitors 510, 520, and 520 can be the same as (or similar to) the capacitors 325 and 326 of FIGS. 3A and 3B. The circuit 500 also includes diodes 515, 525, and 525. The circuit 500 is connected to a power source 505 that supplies the input voltage Vp. The output voltage Vout 580 of the circuit 500 is equal to 3 times Vp. It will also be appreciated that FIGS. 5A and 5B are the same circuit being drawn in different ways.

Figure 6A:
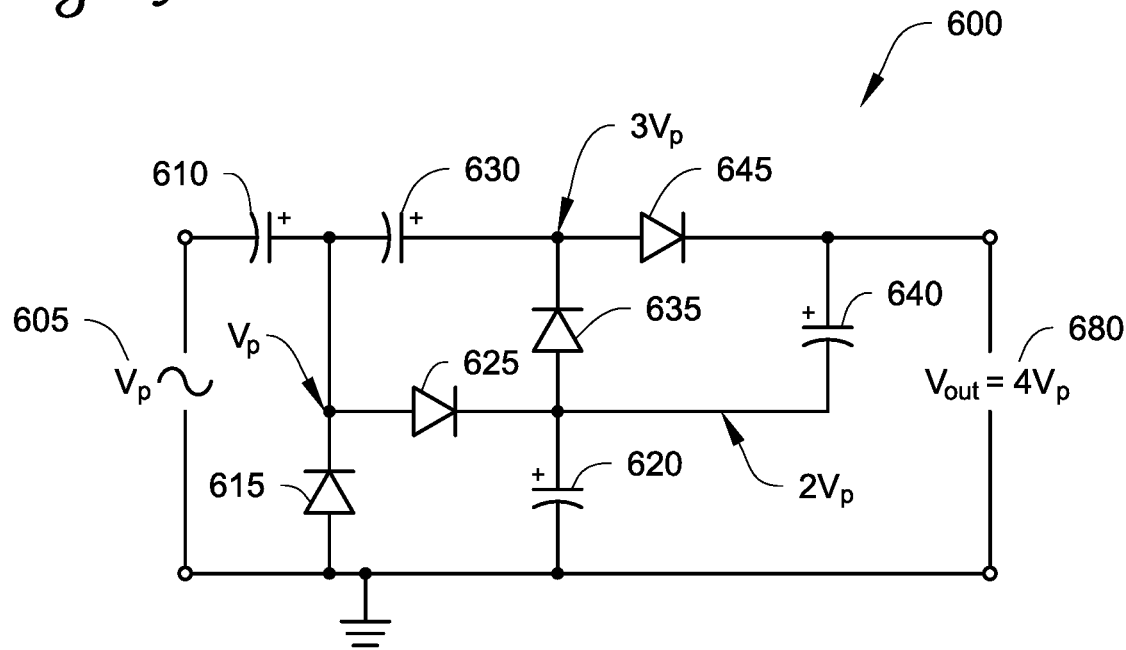
FIGS. 6A and 6B illustrates embodiments of a passive voltage booster circuit (quadrupler), according to one embodiment.
Figure 6B:
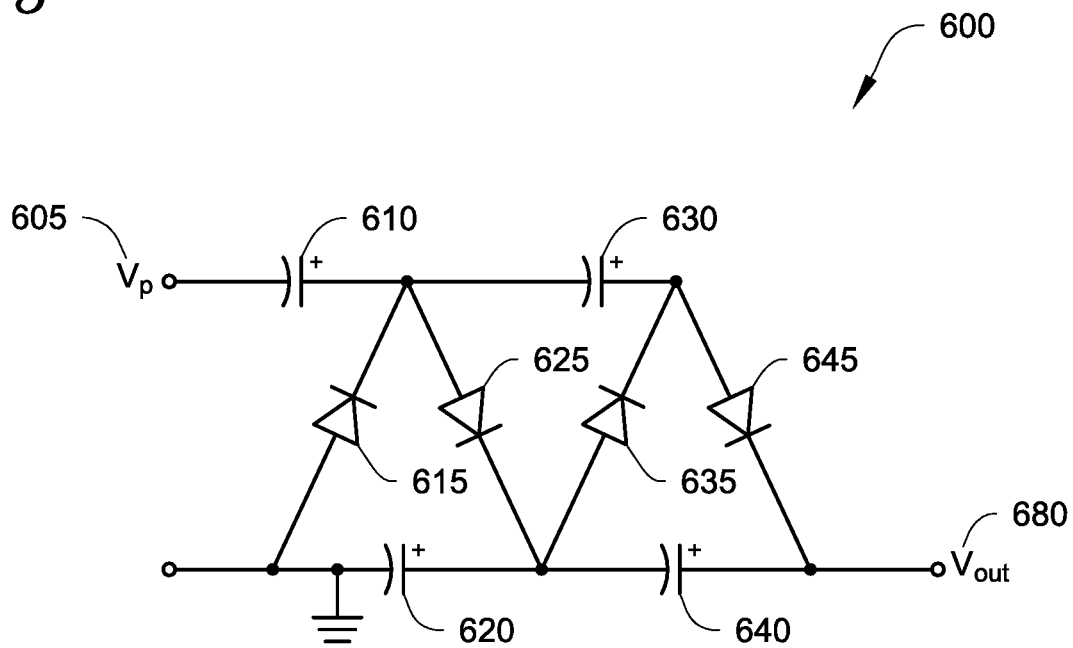

FIGS. 6A and 6B illustrates embodiments of a passive voltage booster circuit 600 configured to quadruple an input voltage Vp (also referred to as a quadrupler circuit), according to one embodiment.

As shown in FIGS. 6A and 6B, the passive voltage booster circuit 600 includes capacitors 610, 620, 630, and 640. It will be appreciated that the capacitors 610, 620, 630, and 640 can be the same as (or similar to) the capacitors 325 and 326 of FIGS. 3A and 3B. The circuit 600 also includes diodes 615, 625, 635, and 645. The circuit 600 is connected to the power source 605 that supplies the input voltage Vp. The output voltage Vout 680 of the circuit 600 is equal to 4 times Vp. It will also be appreciated that FIGS. 6A and 6B are the same circuit being drawn in different ways.

It will be appreciated that in FIG. 4A-6B, the switches controlled by the controller to activate or deactivate the boosters are not shown. It will also be appreciated that similarly, the booster can be up to nth degree by adding more diodes and capacitors to keep charging up. It will be further appreciated that for boosters of nth degree, the usage are limited to the maximum current that the load can drain from the boosters. It will also be appreciated that in FIG. 4A-6B, the diodes can be optional FIG. 7 is a flow chart illustrating a method 700 for controlling power received from different types of utility power sources for a transport climate control system, according to one embodiment.

Figure 7:
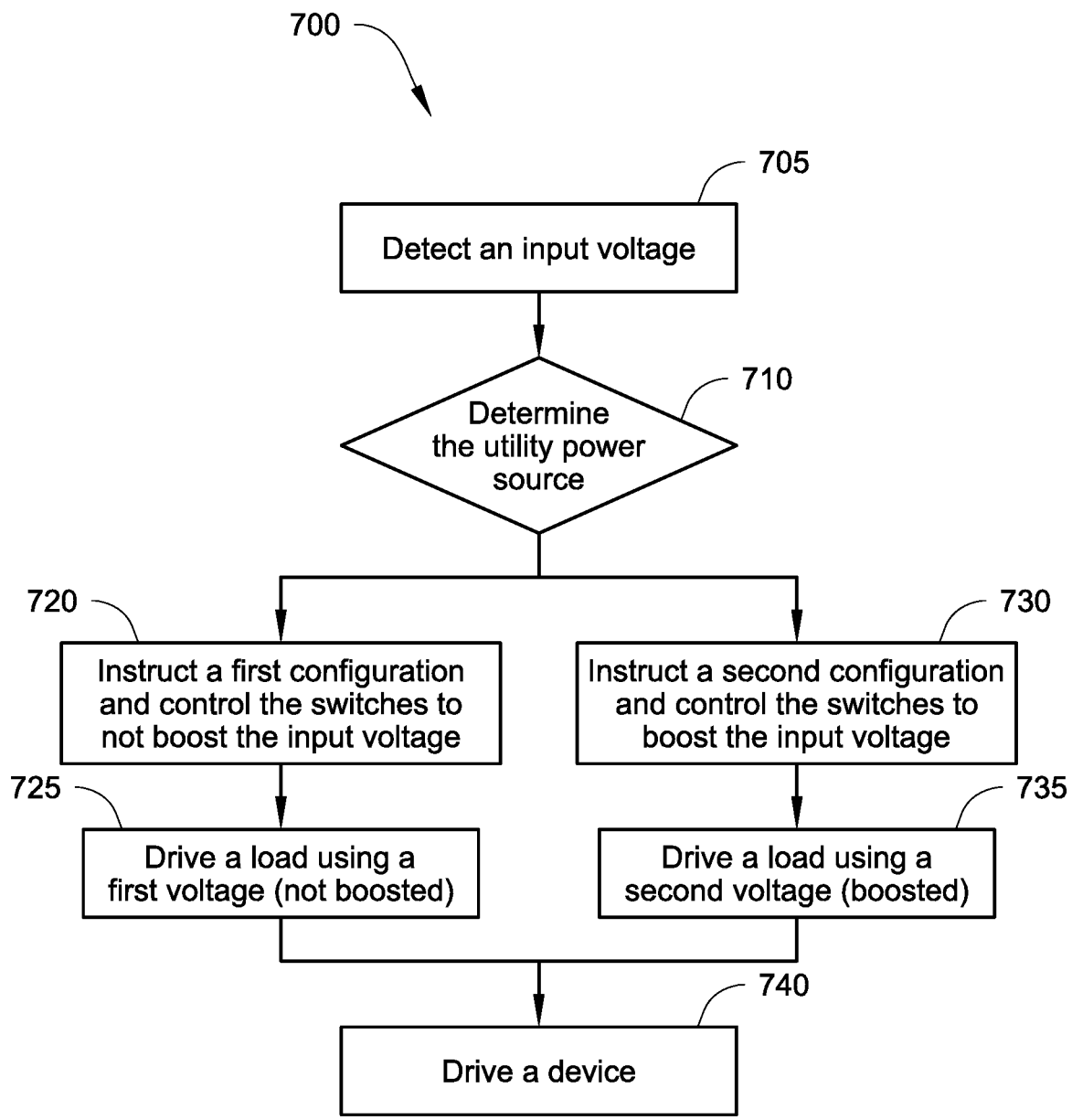
FIG. 7 is a flow chart illustrating a method for controlling power received from different types of utility power sources for a transport climate control system, according to one embodiment.

As shown in FIG. 7, the method begins at 705 whereby a device such as a voltage sensor (not shown) detects an input voltage from a utility power source. The method proceeds to 710. At 710, a controller (such as the controller 205 of FIG. 2) determines whether a passive boost circuit (such as the booster 215 of FIG. 2 or circuit 300 of FIG. 3) is connected to a first utility power (e.g., 220 VAC or 230 VAC) source or a second utility power (e.g., 110 VAC or 120 VAC) source. The controller can determine the utility power source based on the detected input voltage from the device that connects to the controller. The method then proceeds to either 720 when the passive boost circuit is connected to the first utility power source or 730 when the passive boost circuit is connected to the second utility power.

At 720, the controller instructs the passive boost circuit to operate in a first configuration (e.g., non-boosting configuration/mode). In the non-boosting configuration, the controller can control the switches (such as the switches 315 and 320 of FIG. 3) so that the passive boost circuit does not boost the input voltage from the first utility power source. Then the method proceeds to 725. At 725, the passive boost circuit drives a load, such as a motor (either directly or via an inverter that invert a DC power to an AC power), using a first voltage (e.g., rectified input voltage) from the first utility power.

At 730, the controller instructs the passive boost circuit to operate in a second configuration. (e.g., boosting configuration/mode). In the boosting configuration, the controller can control the switches (such as the switches 315 and 320 of FIG. 3) so that the passive boost circuit boosts the input voltage from the second utility power source to a boosted voltage. Then the method proceeds to 735. At 735, the passive boost circuit drives a load such as a motor (either directly or via an inverter that inverts a DC power to an AC power) using the boosted voltage (e.g., two times the rectified input voltage).

From 725 or 735, the method proceeds to 740. At 740, the load drives a device (a compressor, a fan, etc.) using the output voltage from the passive boost circuit.

It will be appreciated that in one embodiment, a utility power source may have voltage that is very low such that the boosted voltage is not high enough to drive the load such as a motor (either directly or via an inverter that inverts a DC power to an AC power). In such embodiment, based on the detected low input voltage, the controller can issue an alert to the user/system, and/or always boost the input voltage, and/or instruct the system to disconnect from the utility power source.

It will also be appreciated that in one embodiments, a utility power source may have voltage that is very high such that either the input voltage itself or the boosted voltage exceeds a safety threshold of running the load such as a motor (either directly or via an inverter that inverts a DC power to an AC power). In such embodiment, based on the detected high input voltage, the controller can issue an alert to the user/system, and/or boost the input voltage only for a percentage of time, and/or instruct the system to disconnect from the utility power source.

Aspects:

It is appreciated that any of aspects 1-8 and 9-16 can be combined.

Aspect 1. A transport climate control system, comprising:
  a passive boost circuit;
  a controller configured to determine whether the passive boost circuit is connected to one of a first utility power and a second utility power, the controller instructing the passive boost circuit to operate in a first configuration when the passive boost circuit is connected to the first utility power and instructing the passive boost circuit to operate in a second configuration when the passive boost circuit is connected to the second utility power; and
  a load connected to the passive boost circuit and configured to receive power from the passive boost circuit,
  when the passive boost circuit is connected to the first utility power, the passive boost circuit is configured to drive the load using a first voltage from the first utility power,
  when the passive boost circuit is connected to the second utility power, the passive boost circuit is configured to boost a second voltage from the second utility power, and drive the load using the boosted voltage,
  wherein the first voltage is greater than the second voltage.

Aspect 2. The system of aspect 1, wherein the first voltage equals to two times the second voltage.

Aspect 3. The system of aspect 1 or aspect 2, wherein the passive boost circuit includes a voltage doubler portion, the voltage doubler portion is configured to boost the second voltage when the passive boost circuit is connected to the second utility power.

Aspect 4. The system of any one of aspects 1-3, wherein the passive boost circuit includes a switch, and
  wherein when the passive boost circuit is connected to the first utility power, the controller is configured to turn off the switch so that the first voltage is used to drive the load.

Aspect 5. The system of any one of aspects 1-4, wherein the passive boost circuit includes a switch, and
  wherein when the passive boost circuit is connected to the second utility power, the controller is configured to turn on the switch so that the second voltage is boosted and the boosted voltage is used to drive the load.

Aspect 6. The system of any one of aspects 1-5, wherein the passive boost circuit has an input voltage and an output voltage, and
  wherein when the passive boost circuit is connected to the first utility power, the input voltage is the first voltage and the output voltage is a rectified voltage of the first voltage, and the output voltage is used to drive the load.

Aspect 7. The system of any one of aspects 1-6, wherein the passive boost circuit has an input voltage and an output voltage, and
  wherein when the passive boost circuit is connected to the second utility power, the input voltage is the second voltage and the output voltage is a rectified voltage of the boosted voltage, and the output voltage is used to drive the load.

Aspect 8. The system of aspect 7, wherein the rectified voltage of the boosted voltage is equal to a rectified voltage of the first voltage.

Aspect 9. A method for managing multiple utility power supplies for a transport climate control system, the method comprising:
  a controller determining whether the passive boost circuit is connected to one of a first utility power and a second utility power;
  the controller instructing the passive boost circuit to operate in a first configuration when the passive boost circuit is connected to the first utility power and instructing the passive boost circuit to operate in a second configuration when the passive boost circuit is connected to the second utility power;
  the passive boost circuit driving a load using a first voltage from the first utility power when the passive boost circuit is connected to the first utility power;
  when the passive boost circuit is connected to the second utility power, the passive boost circuit boosting a second voltage from the second utility power and driving the load using the boosted voltage,
  wherein the first voltage is greater than the second voltage.

Aspect 10. The method of aspect 9, wherein the first voltage equals to two times the second voltage.

Aspect 11. The method of aspect 9 or aspect 10, wherein the passive boost circuit includes a voltage doubler portion, the voltage doubler portion boosting the second voltage when the controller determines that the passive boost circuit is connected to the second utility power.

Aspect 12. The method of any one of aspects 9-11, wherein the passive boost circuit includes a switch, the method further comprising:
  when the passive boost circuit is connected to the first utility power, the controller turning off the switch so that the first voltage is used to drive the load.

Aspect 13. The method of any one of aspects 9-12, wherein the passive boost circuit includes a switch, the method further comprising:
  when the passive boost circuit is connected to the second utility power, the controller turning on the switch so that the second voltage is boosted and the boosted voltage is used to drive the load.

Aspect 14. The method of any one of aspects 9-13, wherein the passive boost circuit has an input voltage and an output voltage, the method further comprising:
  when the passive boost circuit is connected to the first utility power, the output voltage being used to drive the load, wherein the input voltage is the first voltage and the output voltage is a rectified voltage of the first voltage.

Aspect 15. The method of any one of aspects 9-14, wherein the passive boost circuit has an input voltage and an output voltage, the method further comprising:
  when the passive boost circuit is connected to the second utility power, the output voltage being used to drive the load, wherein the input voltage is the second voltage and the output voltage is a rectified voltage of the boosted voltage.

Aspect 16. The method of aspect 15, wherein the rectified voltage of the boosted voltage is equal to a rectified voltage of the first voltage.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A transport climate control system, comprising:
   a passive boost circuit;
   a controller configured to determine whether the passive boost circuit is connected to one of a first utility power and a second utility power, the controller instructing the passive boost circuit to operate in a first configuration when the passive boost circuit is connected to the first utility power and instructing the passive boost circuit to operate in a second configuration when the passive boost circuit is connected to the second utility power; and
   a motor driving a component of the transport climate control system, the motor being connected to the passive boost circuit and configured to receive power from the passive boost circuit,
   when the passive boost circuit is connected to the first utility power, the passive boost circuit is configured to drive the motor using a first voltage from the first utility power,
   when the passive boost circuit is connected to the second utility power, the passive boost circuit is configured to boost a second voltage from the second utility power, and drive the motor using the boosted voltage,
   wherein the first voltage is greater than the second voltage,
   wherein the motor has a back electromotive force incompatible with the second voltage,
   wherein the controller is configured to determine a working voltage of the motor, the working voltage is greater than the second voltage,
   wherein the controller is configured to control the motor to provide temperature control within a space of the transport climate control system.

2. The system of claim 1, wherein the first voltage equals to two times the second voltage.

3. The system of claim 1, wherein the passive boost circuit includes a voltage doubler portion, the voltage doubler portion is configured to boost the second voltage when the passive boost circuit is connected to the second utility power.

4. The system of claim 1, wherein the passive boost circuit includes a switch, and wherein when the passive boost circuit is connected to the first utility power, the controller is configured to turn off the switch so that the first voltage is used to drive the motor.

5. The system of claim 1, wherein the passive boost circuit includes a switch, and
   wherein when the passive boost circuit is connected to the second utility power, the controller is configured to turn on the switch so that the second voltage is boosted and the boosted voltage is used to drive the motor.

6. The system of claim 1, wherein the passive boost circuit has an input voltage and an output voltage, and
   wherein when the passive boost circuit is connected to the first utility power, the input voltage is the first voltage and the output voltage is a rectified voltage of the first voltage, and the output voltage is used to drive the motor.

7. The system of claim 1, wherein the passive boost circuit has an input voltage and an output voltage, and
   wherein when the passive boost circuit is connected to the second utility power, the input voltage is the second voltage and the output voltage is a rectified voltage of the boosted voltage, and the output voltage is used to drive the motor.

8. The system of claim 7, wherein the rectified voltage of the boosted voltage is equal to a rectified voltage of the first voltage.

9. A method for managing multiple utility power supplies for a transport climate control system, the method comprising:
   a controller determining whether a passive boost circuit is connected to one of a first utility power and a second utility power;
   the controller instructing the passive boost circuit to operate in a first configuration when the passive boost circuit is connected to the first utility power and instructing the passive boost circuit to operate in a second configuration when the passive boost circuit is connected to the second utility power;
   the passive boost circuit driving a motor using a first voltage from the first utility power when the passive boost circuit is connected to the first utility power, the motor driving a component of the transport climate control system;
   when the passive boost circuit is connected to the second utility power, the passive boost circuit boosting a second voltage from the second utility power and driving the motor using the boosted voltage,
   the controller determining a working voltage of the motor, the working voltage being greater than the second voltage;
   the controller controlling the motor to provide temperature control within a space of the transport climate control system;
   wherein the first voltage is greater than the second voltage,
   wherein the motor has a back electromotive force incompatible with the second voltage.

10. The method of claim 9, wherein the first voltage equals to two times the second voltage.

11. The method of claim 9, wherein the passive boost circuit includes a voltage doubler portion, the voltage doubler portion boosting the second voltage when the controller determines that the passive boost circuit is connected to the second utility power.

12. The method of claim 9, wherein the passive boost circuit includes a switch, the method further comprising:

when the passive boost circuit is connected to the first utility power, the controller turning off the switch so that the first voltage is used to drive the motor.

13. The method of claim 9, wherein the passive boost circuit includes a switch, the method further comprising:
when the passive boost circuit is connected to the second utility power, the controller turning on the switch so that the second voltage is boosted and the boosted voltage is used to drive the motor.

14. The method of claim 9, wherein the passive boost circuit has an input voltage and an output voltage, the method further comprising:
when the passive boost circuit is connected to the first utility power, the output voltage being used to drive the motor, wherein the input voltage is the first voltage and the output voltage is a rectified voltage of the first voltage.

15. The method of claim 9, wherein the passive boost circuit has an input voltage and an output voltage, the method further comprising:
when the passive boost circuit is connected to the second utility power, the output voltage being used to drive the motor, wherein the input voltage is the second voltage and the output voltage is a rectified voltage of the boosted voltage.

16. The system of claim 1, wherein
the component is a compressor, the compressor has an operational curve defining an operation boundary of the compressor, and
when an input voltage of the compressor increases, the compressor is configured to operate with increased speed or torque.

17. The system of claim 1, wherein the passive boost circuit includes a capacitor having a high capacitance, and an output current from the passive boost circuit is lower than an output current from the second utility power.

18. The system of claim 1, wherein when the working voltage of the motor is greater than the boosted voltage, the controller is configured to issue an alert or to instruct the transport climate control system to disconnect from the second power source.

19. The system of claim 1, wherein when the first voltage or the boosted voltage exceeds or is below a threshold the working voltage of the motor, the controller is configured to always boost the second voltage, boost the second voltage for a predetermined period of time, or to instruct the transport climate control system to disconnect from the first power source or the second power source.

20. The system of claim 1, wherein the component is a compressor or a fan of the transport climate control system.

* * * * *